US012598030B2

(12) United States Patent (10) Patent No.: US 12,598,030 B2
Liu et al. (45) Date of Patent: Apr. 7, 2026

(54) COMMUNICATION METHOD AND APPARATUS

(71) Applicant: Huawei Technologies Co., Ltd., Shenzhen (CN)

(72) Inventors: Xianda Liu, Beijing (CN); Liuliu Ji, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 362 days.

(21) Appl. No.: 18/304,700

(22) Filed: Apr. 21, 2023

(65) Prior Publication Data

US 2023/0299893 A1 Sep. 21, 2023

Related U.S. Application Data

(63) Continuation of application No. PCT/CN2020/123013, filed on Oct. 22, 2020.

(51) Int. Cl.
*H04L 1/1829* (2023.01)
*H04L 5/00* (2006.01)
(Continued)

(52) U.S. Cl.
CPC .......... *H04L 1/1861* (2013.01); *H04L 5/0053* (2013.01); *H04W 72/21* (2023.01); *H04W 72/23* (2023.01)

(58) Field of Classification Search
CPC ... H04L 1/1861; H04L 5/0053; H04L 1/1854; H04L 1/1614; H04L 1/1825;
(Continued)

(56) References Cited

U.S. PATENT DOCUMENTS

2011/0128922 A1* 6/2011 Chen ..................... H04L 5/0094
370/329
2016/0226644 A1* 8/2016 Gaal ..................... H04L 1/0078
(Continued)

FOREIGN PATENT DOCUMENTS

CN 110086583 A 8/2019
CN 110536451 A 12/2019
(Continued)

OTHER PUBLICATIONS

Nokia, Nokia Shanghai Bell, "Enhancements on Multi-TRP/Panel Transmission", R1-1912719, 3GPP TSG RAN WG1 #99 Meeting, Reno, U.S.A., Nov. 18-22, 2019 (Year: 2019).*
(Continued)

*Primary Examiner* — Ayaz R Sheikh
*Assistant Examiner* — Tarell A Hampton
(74) *Attorney, Agent, or Firm* — Slater Matsil, LLP

(57) ABSTRACT

A terminal device detects first DCI on a first PDCCH monitoring occasion, detects second DCI on a second PDCCH monitoring occasion, generates a hybrid automatic repeat request acknowledgement HARQ-ACK codebook based on the first PDCCH monitoring occasion and a DAI indication carried in at least one of the first DCI and the second DCI, and sends the HARQ-ACK codebook. The first DCI and the second DCI are for scheduling a same transport block TB, and the first DCI and the second DCI carry a same downlink assignment index DAI indication.

20 Claims, 14 Drawing Sheets

(51) Int. Cl.
  *H04W 72/21* (2023.01)
  *H04W 72/23* (2023.01)

(58) Field of Classification Search
  CPC ... H04L 1/1896; H04L 5/0055; H04L 5/0091;
        H04L 1/08; H04W 72/21; H04W 72/23
  See application file for complete search history.

(56) References Cited

U.S. PATENT DOCUMENTS

| | | | |
|---|---|---|---|
| 2019/0103943 A1* | 4/2019 | Wang | H04L 1/1854 |
| 2020/0221428 A1* | 7/2020 | Moon | H04B 7/088 |
| 2020/0295810 A1* | 9/2020 | Baldemair | H04L 1/1864 |
| 2020/0295882 A1* | 9/2020 | Wang | H04L 1/1896 |
| 2021/0068115 A1* | 3/2021 | Gotoh | H04W 72/0453 |
| 2021/0359790 A1* | 11/2021 | Yerramalli | H04W 72/0446 |
| 2022/0116962 A1 | 4/2022 | Zhang et al. | |
| 2022/0255703 A1* | 8/2022 | Song | H04W 72/04 |
| 2022/0286868 A1* | 9/2022 | Kim | H04W 24/08 |
| 2022/0329386 A1* | 10/2022 | Ye | H04L 5/001 |
| 2023/0046085 A1* | 2/2023 | Wu | H04L 1/1861 |
| 2023/0076897 A1* | 3/2023 | Svedman | H04L 5/0094 |
| 2023/0224898 A1* | 7/2023 | Ling | H04L 5/0044 |
| | | | 370/329 |

FOREIGN PATENT DOCUMENTS

| | | | | |
|---|---|---|---|---|
| JP | 2023523812 A | 6/2023 | | |
| JP | 2023544575 A | 10/2023 | | |
| WO | WO-2010141607 A2 * | 12/2010 | | H04W 72/23 |
| WO | 2022044277 A1 | 3/2022 | | |
| WO | 2022119423 A1 | 6/2022 | | |

OTHER PUBLICATIONS

LG Electronics, "Enhancements on multi-TRP/panel transmission", R1-1912269, 3GPP TSG RAN WG1 Meeting #99, Reno, USA, Nov. 18-22, 2019 (Year: 2019).*

* cited by examiner

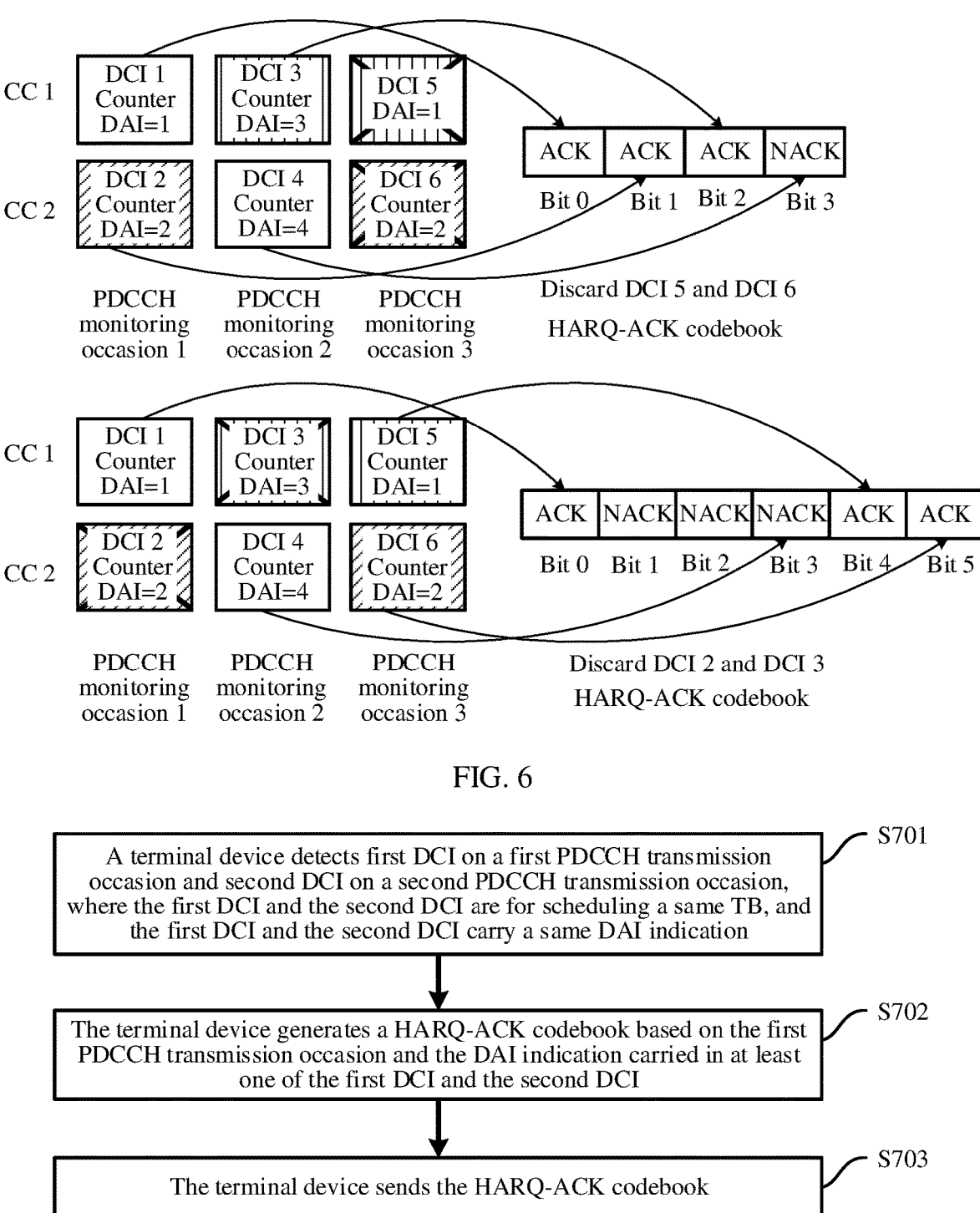

FIG. 6

A terminal device detects first DCI on a first PDCCH transmission occasion and second DCI on a second PDCCH transmission occasion, where the first DCI and the second DCI are for scheduling a same TB, and the first DCI and the second DCI carry a same DAI indication
S701

The terminal device generates a HARQ-ACK codebook based on the first PDCCH transmission occasion and the DAI indication carried in at least one of the first DCI and the second DCI
S702

The terminal device sends the HARQ-ACK codebook
S703

FIG. 7

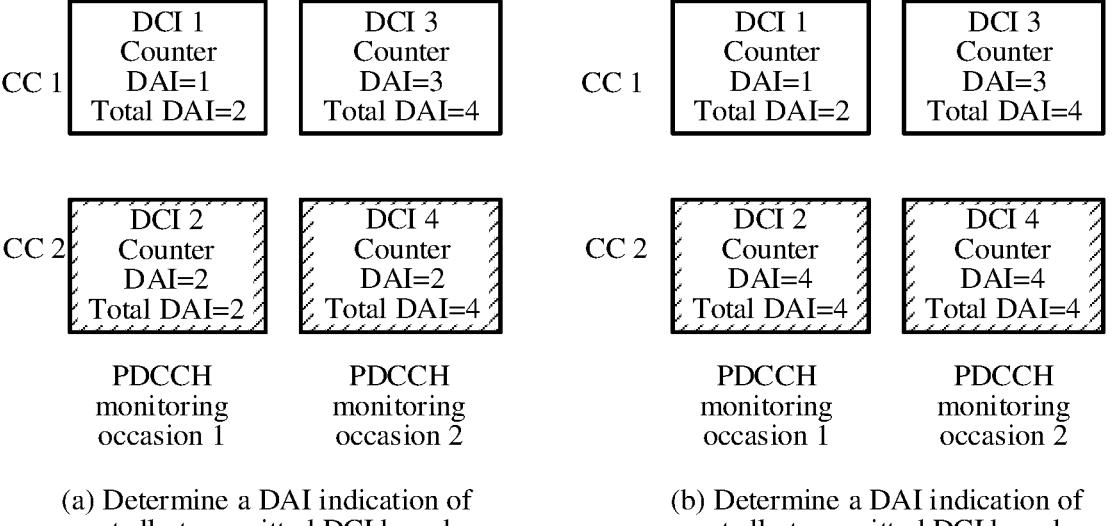

CC 1

| DCI 1 Counter DAI=1 Total DAI=2 | DCI 3 Counter DAI=3 Total DAI=4 |

CC 2

| DCI 2 Counter DAI=2 Total DAI=2 | DCI 4 Counter DAI=2 Total DAI=4 |

PDCCH monitoring occasion 1    PDCCH monitoring occasion 2

(a) Determine a DAI indication of repeatedly transmitted DCI based on a PDCCH monitoring occasion 1

CC 1

| DCI 1 Counter DAI=1 Total DAI=2 | DCI 3 Counter DAI=3 Total DAI=4 |

CC 2

| DCI 2 Counter DAI=4 Total DAI=4 | DCI 4 Counter DAI=4 Total DAI=4 |

PDCCH monitoring occasion 1    PDCCH monitoring occasion 2

(b) Determine a DAI indication of repeatedly transmitted DCI based on a PDCCH monitoring occasion 2

FIG. 8

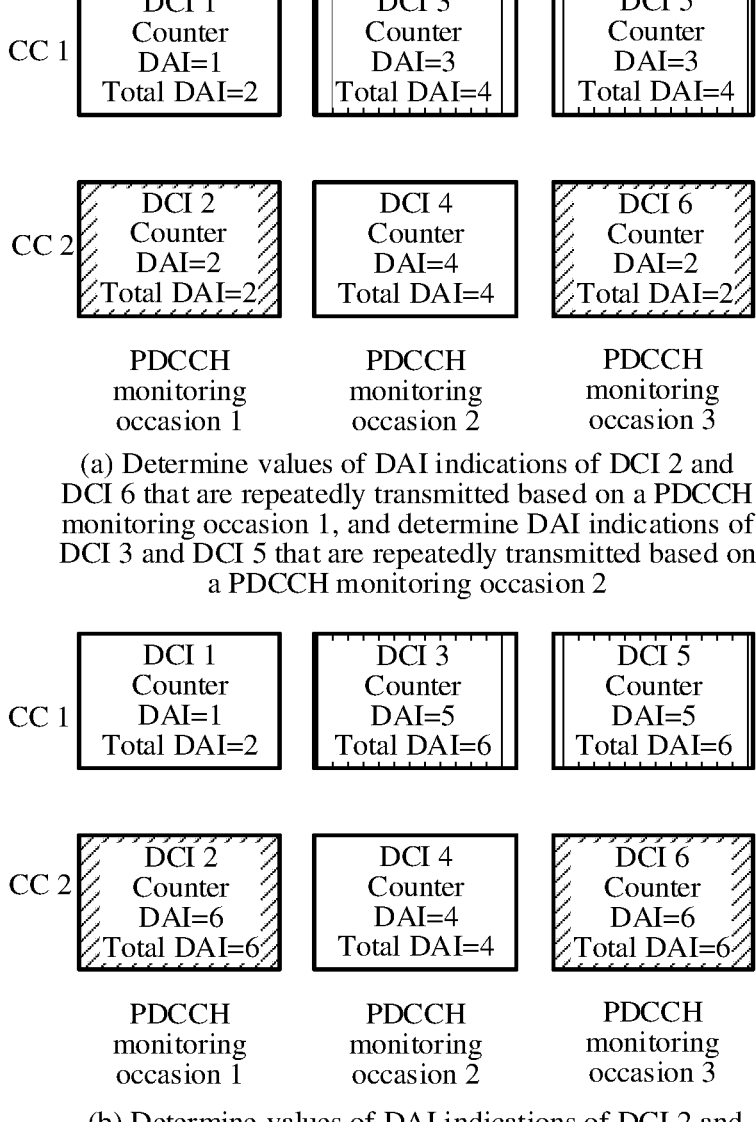

(a) Determine values of DAI indications of DCI 2 and DCI 6 that are repeatedly transmitted based on a PDCCH monitoring occasion 1, and determine DAI indications of DCI 3 and DCI 5 that are repeatedly transmitted based on a PDCCH monitoring occasion 2

(b) Determine values of DAI indications of DCI 2 and DCI 6 that are repeatedly transmitted based on a PDCCH monitoring occasion 3, and determine DAI indications of DCI 3 and DCI 5 that are repeatedly transmitted based on the PDCCH monitoring occasion 3

FIG. 9

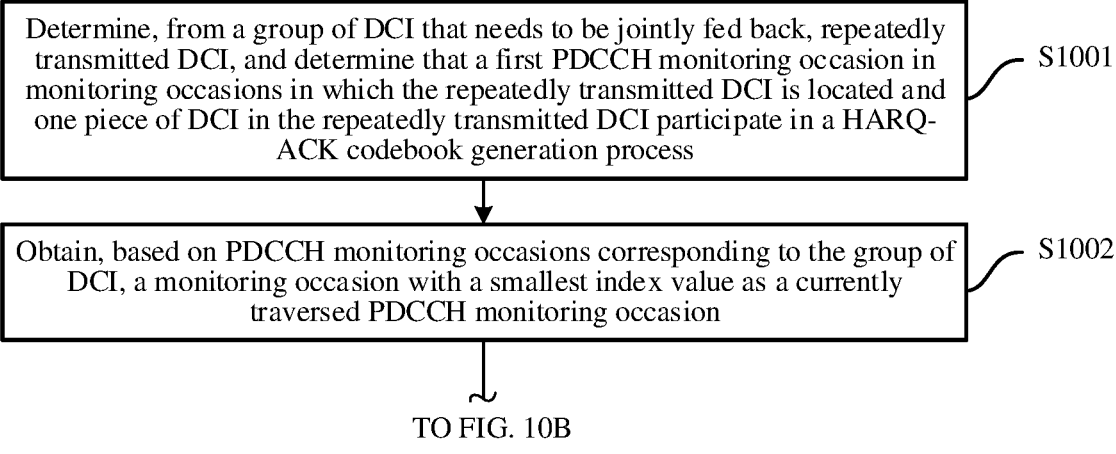

Determine, from a group of DCI that needs to be jointly fed back, repeatedly transmitted DCI, and determine that a first PDCCH monitoring occasion in monitoring occasions in which the repeatedly transmitted DCI is located and one piece of DCI in the repeatedly transmitted DCI participate in a HARQ-ACK codebook generation process — S1001

Obtain, based on PDCCH monitoring occasions corresponding to the group of DCI, a monitoring occasion with a smallest index value as a currently traversed PDCCH monitoring occasion — S1002

CONT. FROM FIG. 10A

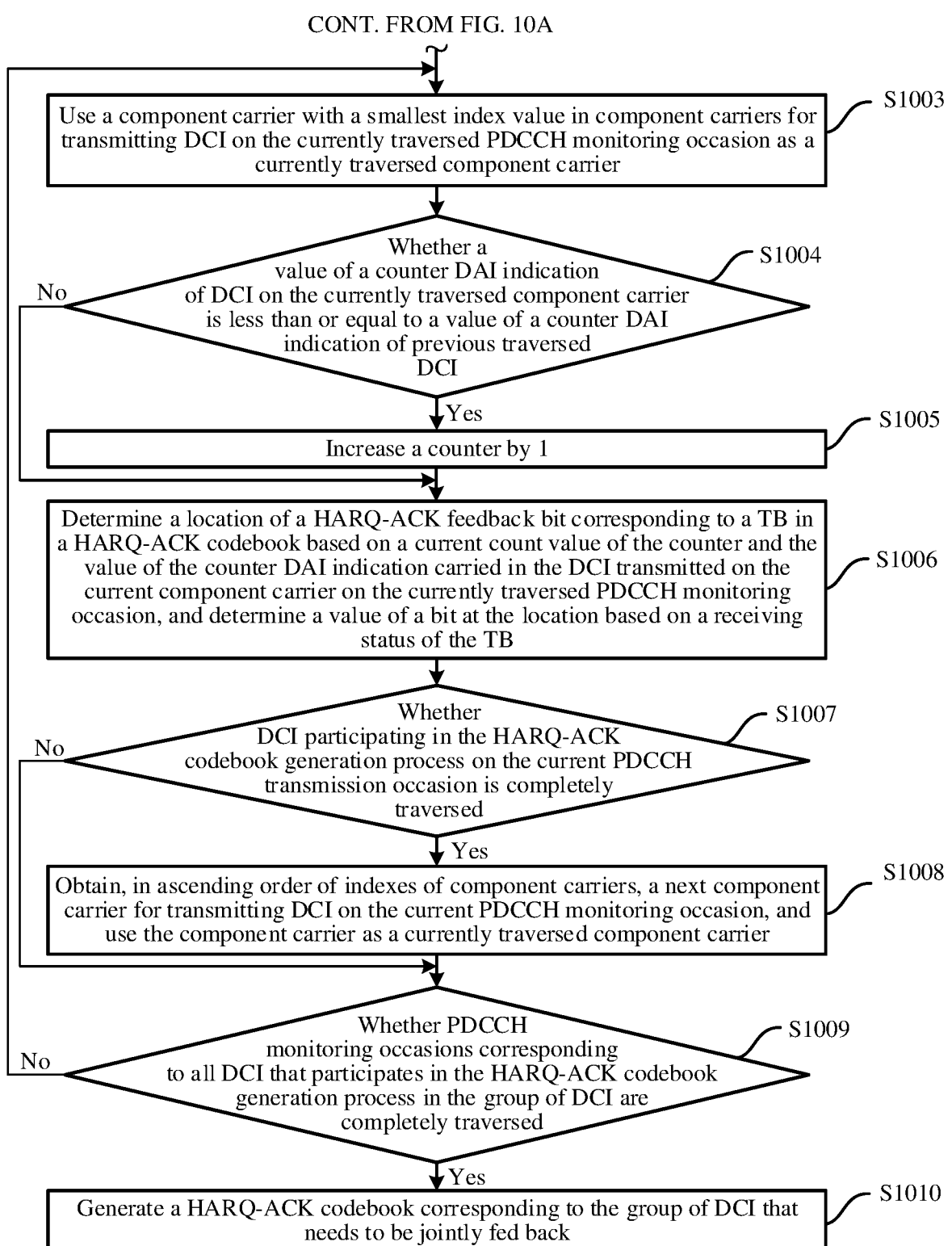

S1003 — Use a component carrier with a smallest index value in component carriers for transmitting DCI on the currently traversed PDCCH monitoring occasion as a currently traversed component carrier S1004 — Whether a value of a counter DAI indication of DCI on the currently traversed component carrier is less than or equal to a value of a counter DAI indication of previous traversed DCI No Yes S1005 — Increase a counter by 1

S1006 — Determine a location of a HARQ-ACK feedback bit corresponding to a TB in a HARQ-ACK codebook based on a current count value of the counter and the value of the counter DAI indication carried in the DCI transmitted on the current component carrier on the currently traversed PDCCH monitoring occasion, and determine a value of a bit at the location based on a receiving status of the TB S1007 — Whether DCI participating in the HARQ-ACK codebook generation process on the current PDCCH transmission occasion is completely traversed No Yes S1008 — Obtain, in ascending order of indexes of component carriers, a next component carrier for transmitting DCI on the current PDCCH monitoring occasion, and use the component carrier as a currently traversed component carrier S1009 — Whether PDCCH monitoring occasions corresponding to all DCI that participates in the HARQ-ACK codebook generation process in the group of DCI are completely traversed No Yes S1010 — Generate a HARQ-ACK codebook corresponding to the group of DCI that needs to be jointly fed back

FIG. 10B

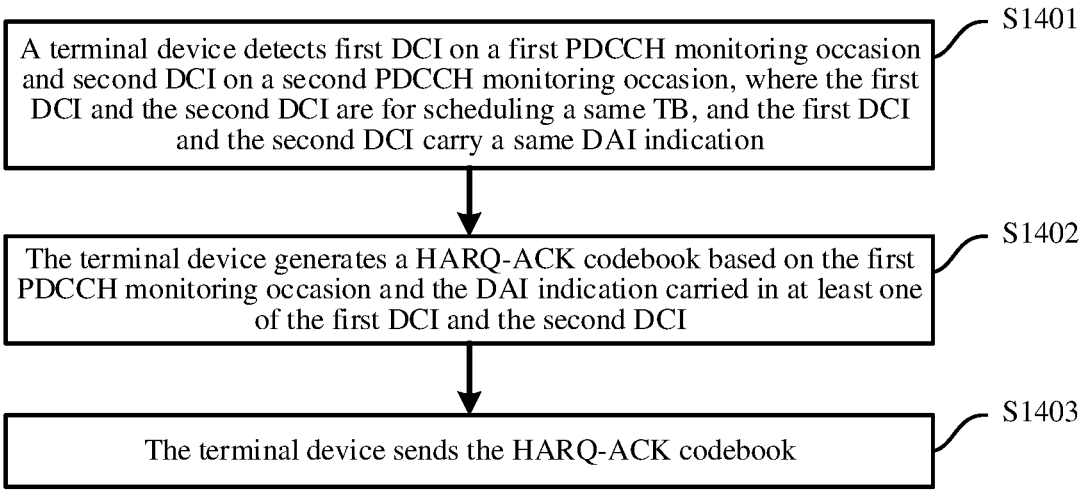

A terminal device detects first DCI on a first PDCCH monitoring occasion and second DCI on a second PDCCH monitoring occasion, where the first DCI and the second DCI are for scheduling a same TB, and the first DCI and the second DCI carry a same DAI indication          S1401

The terminal device generates a HARQ-ACK codebook based on the first PDCCH monitoring occasion and the DAI indication carried in at least one of the first DCI and the second DCI          S1402

The terminal device sends the HARQ-ACK codebook          S1403

FIG. 14

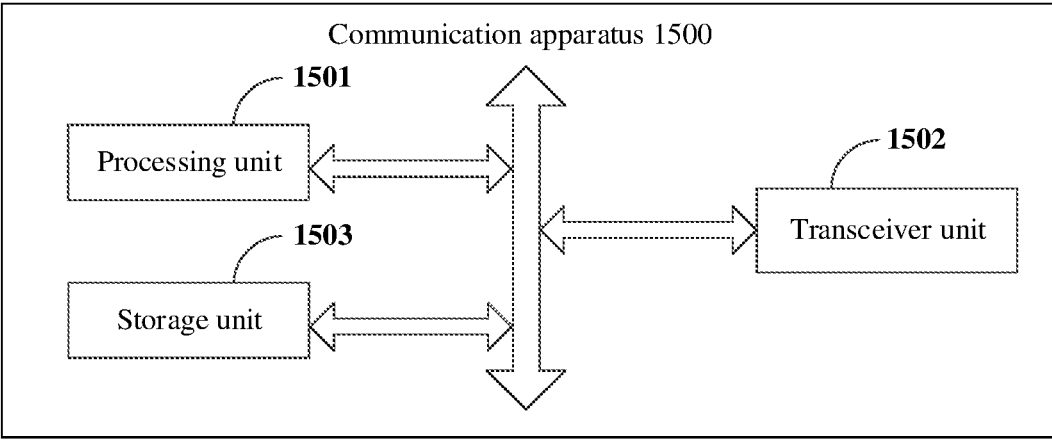

Communication apparatus 1500

1501
Processing unit

1503
Storage unit

1502
Transceiver unit

FIG. 15

COMMUNICATION METHOD AND APPARATUS

CROSS-REFERENCE TO RELATED APPLICATIONS

This application is a continuation of International Application No. PCT/CN2020/123013, filed on Oct. 22, 2020, the disclosure of which is hereby incorporated by reference in its entirety.

TECHNICAL FIELD

This application relates to the field of wireless communication technologies, and in particular, to a communication method and apparatus.

BACKGROUND

In a wireless communication system, a hybrid automatic repeat request (HARQ) technology is generally used to improve reliability of data transmission.

Downlink transmission is used as an example. After receiving a physical downlink shared channel (PDSCH) sent by a network device, a terminal device sends hybrid automatic repeat request acknowledgement (HARQ-ACK) feedback information to the network device, to notify the network device whether a transport block (TB) carried on the PDSCH is successfully decoded. If the TB is successfully decoded, the terminal device feeds back an acknowledgement (ACK); and if the TB is not successfully decoded, the terminal device feeds back a negative acknowledgement (NACK).

Generally, the HARQ-ACK feedback information is carried in a HARQ-ACK codebook and sent to the network device. One HARQ-ACK codebook may include HARQ-ACK feedback information corresponding to one or more PDSCH scheduling.

How to ensure that the network device correctly receives the HARQ-ACK feedback information is a technical problem that needs to be resolved currently.

SUMMARY

This application provides a communication method and apparatus, so that a network device correctly receives HARQ-ACK feedback information.

According to a first aspect, a communication method is provided. The method includes:

A terminal device detects first DCI on a first PDCCH monitoring occasion, and detects second DCI on a second PDCCH monitoring occasion, where the first DCI and the second DCI are for scheduling a same transport block TB, and the first DCI and the second DCI carry a same DAI indication.

The terminal device generates a hybrid automatic repeat request acknowledgement HARQ-ACK codebook based on the first PDCCH monitoring occasion and the DAI indication carried in at least one of the first DCI and the second DCI.

The terminal device sends the HARQ-ACK codebook.

In another possible implementation, the terminal device detects first DCI on a first PDCCH monitoring occasion, and detects second DCI on a second PDCCH monitoring occasion, where the first PDCCH monitoring occasion and the second PDCCH monitoring occasion have an association relationship.

The terminal device generates a hybrid automatic repeat request acknowledgement HARQ-ACK codebook based on a DAI indication carried in the second DCI and the first PDCCH monitoring occasion, where a location of a HARQ-ACK bit corresponding to the second DCI in the HARQ-ACK codebook is determined based on the DAI indication and the first PDCCH monitoring occasion.

The terminal device sends the HARQ-ACK codebook.

In the foregoing embodiment, the DAI indications carried in the first DCI and the second DCI that are for scheduling a same transport block have a same value, and the terminal device generates the HARQ-ACK codebook based on the DAI indication and the first PDCCH monitoring occasion. Therefore, bits corresponding to the scheduled TBs determined by the terminal device based on both the DAI indication carried in the first DCI and the DAI indication carried in the second DCI are the same, thereby ensuring that a generated HARQ-ACK can be correctly decoded by a network side.

In a possible implementation, that the terminal device generates a HARQ-ACK codebook based on the first PDCCH monitoring occasion and the DAI indication carried in at least one of the first DCI and the second DCI includes:

The terminal device determines, based on the first PDCCH monitoring occasion and the DAI indication carried in at least one of the first DCI and the second DCI, a bit that is of a HARQ-ACK bit corresponding to the TB and that is in the HARQ-ACK codebook.

In the foregoing embodiment, when generating the HARQ-ACK codebook, the terminal device determines, based on the first PDCCH monitoring occasion and a value of the DAI indication carried in at least one of the first DCI and the second DCI, a bit of a HARQ-ACK bit corresponding to the TB scheduled by the first DCI and the second DCI in the HARQ-ACK codebook, so that bits corresponding to the scheduled TB determined based on the value of the DAI indication carried in the first DCI and the value of the DAI indication carried in the second DCI are the same, thereby ensuring that the generated HARQ-ACK can be correctly decoded by the network side.

In a possible implementation, the method further includes: The terminal device receives monitoring occasion configuration information, where the monitoring occasion configuration information indicates that the first PDCCH monitoring occasion and the second PDCCH monitoring occasion are repeated PDCCH monitoring occasions, or that the first PDCCH monitoring occasion and the second PDCCH monitoring occasion have an association relationship, and DCI on the repeated PDCCH monitoring occasions is for scheduling a same TB. It should be understood that the terminal device may determine, based on the monitoring occasion configuration information, that the first DCI and the second DCI schedule a same TB.

In the foregoing embodiment, because the first PDCCH monitoring occasion and the second PDCCH monitoring occasion are repeated PDCCH monitoring occasions, DCI sent on the repeated PDCCH monitoring occasions schedules a same TB, so that DCI transmission reliability can be improved.

In a possible implementation, the first PDCCH monitoring occasion and the second PDCCH monitoring occasion correspond to different monitoring occasions of a search space set, and the monitoring occasion configuration information is configured in the search space set. Because the first DCI and the second DCI that are for scheduling the same TB are on different monitoring occasions of a same search space set, DCI can be repeatedly transmitted at different time, thereby improving the DCI transmission reliability.

In a possible implementation, the first DCI and the second DCI are located on a same component carrier or in a same BWP. Because the first DCI and the second DCI are located on the same subcarrier or in the same BWP, joint transmission of a plurality of pieces of DCI may be supported on a same component carrier/in a same BWP to improve DCI receiving reliability.

In a possible implementation, the first DCI and the second DCI correspond to a same bit in the HARQ-ACK codebook. The first DCI and the second DCI correspond to a same bit in the HARQ-ACK codebook, and the first DCI and the second DCI schedule a same TB. Therefore, it can be ensured that feedback bits corresponding to the same TB are the same.

In a possible implementation, the DAI indication carried in the first DCI and the DAI indication carried in the second DCI are determined based on an index value of the first PDCCH monitoring occasion. Because the value of the DAI indication carried in the first DCI and the value of the DAI indication carried in the second DCI are determined based on the index value of the first PDCCH monitoring occasion, feedback bits corresponding to corresponding TBs determined based on the value of the DAI indication carried in the first DCI and the value of the DAI indication carried in the second DCI are the same, thereby ensuring that the HARQ-ACK can be correctly decoded by the network side.

In a possible implementation, the index value of the first PDCCH monitoring occasion is less than an index value of the second PDCCH monitoring occasion.

In a possible implementation, the terminal device generates the hybrid automatic repeat request acknowledgment HARQ-ACK codebook based on a preset PDCCH monitoring occasion and the DAI indication carried in at least one of the first DCI and the second DCI, where the preset PDCCH monitoring occasion is one of the first PDCCH monitoring occasion and the second PDCCH monitoring occasion.

In a possible implementation, that the first DCI and the second DCI carry a same DAI indication includes: the first DCI and the second DCI carry a same counter DAI indication, and carry a same total DAI indication.

In a possible implementation, after the terminal device receives the second DCI, the method further includes: determining a group of DCI, where HARQ-ACK feedback information corresponding to the group of DCI is fed back on a same PUCCH resource, and the group of DCI includes the second DCI; sorting the group of DCI, where an order of the second DCI in the group of DCI is determined based on the second PDCCH monitoring occasion; and determining target DCI from the group of DCI based on an order of each of the group of DCI, where the target DCI indicates the PUCCH resource.

In the foregoing embodiment, a group of DCI includes the second DCI (HARQ-ACKs corresponding to the group of DCI are fed back on a same PUCCH resource). When a corresponding PUCCH resource for feeding back the HARQ-ACKs is determined, an order of the second DCI in the group of DCI is determined based on the second PDCCH monitoring occasion, and then target DCI is determined from the group of DCI based on the order of the second DCI in the group of DCI, so that the PUCCH resource is determined based on the target DCI. Therefore, a HARQ-ACK location is clear, and the PUCCH resource may be dynamically adjusted.

In a possible implementation, after the terminal device receives the first DCI and the second DCI, the method further includes: determining a group of DCI, where HARQ-ACK feedback information corresponding to the group of DCI is fed back on a same PUCCH resource, and the group of DCI includes the first DCI and the second DCI; sorting the group of DCI, where an order of the first DCI in the group of DCI is determined based on the first monitoring occasion, and an order of the second DCI in the group of DCI is determined based on the second PDCCH monitoring occasion; and determining target DCI from the group of DCI based on an order of each of the group of DCI, where the target DCI indicates the PUCCH resource.

In the foregoing embodiment, the first DCI and the second DCI belong to a group of DCI (HARQ-ACKs corresponding to the group of DCI are fed back on a same PUCCH resource). When a corresponding PUCCH resource for feeding back the HARQ-ACKs is determined, an order of the second DCI in the group of DCI is determined based on the second PDCCH monitoring occasion, and then target DCI is determined from the group of DCI based on the order of the second DCI in the group of DCI, so that the PUCCH resource is determined based on the target DCI. Therefore, a HARQ-ACK location is clear, and the PUCCH resource may be dynamically adjusted.

In a possible implementation, before the terminal device sends the HARQ-ACK codebook, the method further includes: receiving configuration information, where the configuration information indicates that a first PDCCH candidate and a second PDCCH candidate have an association relationship, the first DCI corresponds to the first PDCCH candidate, and the second DCI corresponds to the second PDCCH candidate; determining a group of DCI, where the group of DCI includes the first DCI and/or the second DCI, and HARQ-ACK feedback information corresponding to the group of DCI is fed back on a same PUCCH resource; sorting the group of DCI, where an order of the first DCI and/or the second DCI in the group of DCI is determined based on the first monitoring occasion; and determining target DCI from the group of DCI based on an order of each of the group of DCI, where the target DCI indicates the PUCCH resource.

In the foregoing embodiment, the first DCI and the second DCI belong to a group of DCI (HARQ-ACKs corresponding to the group of DCI are fed back on a same PUCCH resource). When a corresponding PUCCH resource for feeding back the HARQ-ACKs is determined, an order of the first DCI and/or the second DCI in the group of DCI is determined based on the first PDCCH monitoring occasion, and then target DCI is determined from the group of DCI based on the order of each of the group of DCI, so that the PUCCH resource is determined based on the target DCI. Therefore, a HARQ-ACK location is clear, and the PUCCH resource may be dynamically adjusted.

According to a second aspect, a communication method is provided. The method includes:

A network device sends first DCI on a first PDCCH monitoring occasion, and sends second DCI on a second PDCCH monitoring occasion, where the first DCI and the second DCI are for scheduling a same transport block TB, and the first DCI and the second DCI carry a same DAI indication.

The network device receives a hybrid automatic repeat request acknowledgement HARQ-ACK codebook sent by a terminal device.

The network device determines, based on the first PDCCH monitoring occasion and the DAI indication carried in at least one of the first DCI and the second DCI, HARQ-ACK feedback information corresponding to the TB in the HARQ-ACK codebook.

In a possible implementation, that the network device determines, based on the first PDCCH monitoring occasion and the DAI indication carried in at least one of the first DCI and the second DCI, HARQ-ACK feedback information corresponding to the TB in the HARQ-ACK codebook includes:

The network device determines, based on the first PDCCH monitoring occasion and the DAI indication carried in at least one of the first DCI and the second DCI, a bit that is of a HARQ-ACK bit corresponding to the TB and that is in the HARQ-ACK codebook.

In a possible implementation, the method further includes: the network device sends monitoring occasion configuration information, where the monitoring occasion configuration information indicates that the first PDCCH monitoring occasion and the second PDCCH monitoring occasion are repeated PDCCH monitoring occasions, and DCI sent on the repeated PDCCH monitoring occasions is for scheduling a same TB.

In a possible implementation, the first PDCCH monitoring occasion and the second PDCCH monitoring occasion correspond to different monitoring occasions of a search space set, and the monitoring occasion configuration information is configured in the search space set.

In a possible implementation, the first DCI and the second DCI are located on a same component carrier or in a same BWP.

In a possible implementation, the first DCI and the second DCI correspond to a same bit in the HARQ-ACK codebook.

In a possible implementation, the DAI indication carried in the first DCI and the DAI indication carried in the second DCI are determined based on an index value of the first PDCCH monitoring occasion.

In a possible implementation, the index value of the first PDCCH monitoring occasion is less than an index value of the second PDCCH monitoring occasion.

In a possible implementation, that the first DCI and the second DCI carry a same DAI indication includes:

The first DCI and the second DCI carry a same counter DAI indication, and carry a same total DAI indication.

In a possible implementation, the method further includes: determining a group of DCI, where HARQ-ACK feedback information corresponding to the group of DCI is fed back on a same PUCCH resource, and the group of DCI includes the second DCI; sorting the group of DCI, where an order of the second DCI in the group of DCI is determined based on the second PDCCH monitoring occasion; and determining target DCI from the group of DCI based on an order of each of the group of DCI, where the target DCI indicates the PUCCH resource.

In a possible implementation, the method further includes: determining a group of DCI, where HARQ-ACK feedback information corresponding to the group of DCI is fed back on a same PUCCH resource, and the group of DCI includes the first DCI and the second DCI; sorting the group of DCI, where an order of the first DCI in the group of DCI is determined based on the first monitoring occasion, and an order of the second DCI in the group of DCI is determined based on the second PDCCH monitoring occasion; and determining target DCI from the group of DCI based on an order of each of the group of DCI, where the target DCI indicates the PUCCH resource.

In a possible implementation, the method further includes: sending configuration information, where the configuration information indicates that a first PDCCH candidate and a second PDCCH candidate have an association relationship, the first DCI corresponds to the first PDCCH candidate, and the second DCI corresponds to the second PDCCH candidate; determining a group of DCI, where the group of DCI includes the first DCI and/or the second DCI, and HARQ-ACK feedback information corresponding to the group of DCI is fed back on a same PUCCH resource; sorting the group of DCI, where an order of the first DCI and/or the second DCI in the group of DCI is determined based on the first monitoring occasion; and determining target DCI from the group of DCI based on an order of each of the group of DCI, where the target DCI indicates the PUCCH resource.

According to a third aspect, a communication apparatus is provided, including at least one processor, where the at least one processor is connected to a memory, and the at least one processor is configured to read and execute a program stored in the memory, to cause the communication apparatus to perform the method according to any one of the first aspect.

According to a fourth aspect, a communication apparatus is provided, including at least one processor, where the at least one processor is connected to a memory, and the at least one processor is configured to read and execute a program stored in the memory, to cause the communication apparatus to perform the method according to any one of the second aspect.

According to a fifth aspect, a communication apparatus is provided. The communication apparatus includes a processing unit and a transceiver unit, and may further include a storage unit. The storage unit may be coupled to the processing unit, and is configured to store a program and instructions required by the processing unit to execute a function, so as to implement the method according to any one of the first aspect.

According to a sixth aspect, a communication apparatus is provided. The communication apparatus includes a processing unit and a transceiver unit, and may further include a storage unit. The storage unit may be coupled to the processing unit, and is configured to store a program and instructions required by the processing unit to execute a function, so as to implement the method according to any one of the second aspect.

According to a seventh aspect, a chip is provided. The chip is coupled to a memory, and is configured to read and execute program instructions stored in the memory, to implement the method according to any one of the first aspect or the second aspect.

According to an eighth aspect, a computer-readable storage medium is provided. The computer-readable storage medium stores computer instructions, and when the instructions are run on a computer, the computer is caused to perform the method according to any one of the first aspect or the second aspect.

According to a ninth aspect, a computer program product is provided. When the computer program product is invoked by a computer, the computer is caused to perform the method according to any one of the first aspect or the second aspect.

BRIEF DESCRIPTION OF THE DRAWINGS

FIG. 5 and FIG. 6 are respectively schematic diagrams of HARQ-ACK codebook feedback in a current technology;

FIG. 7 is a schematic flowchart of a communication method implemented on a terminal device side according to an embodiment of this application;

FIG. 8 is a schematic diagram of a DAI indication in repeatedly transmitted DCI according to an embodiment of this application;

FIG. 9 is a schematic diagram of a DAI indication in repeatedly transmitted DCI according to an embodiment of this application;

FIG. 10A and FIG. 10B are a schematic flowchart of a HARQ-ACK codebook generation process according to an embodiment of this application;

FIG. 14 is a schematic flowchart of HARQ-ACK feedback implemented on a network device side according to an embodiment of this application;

FIG. 15 is a schematic diagram of a structure of a communication apparatus according to an embodiment of this application;

DETAILED DESCRIPTION OF ILLUSTRATIVE EMBODIMENTS

Figure 1:
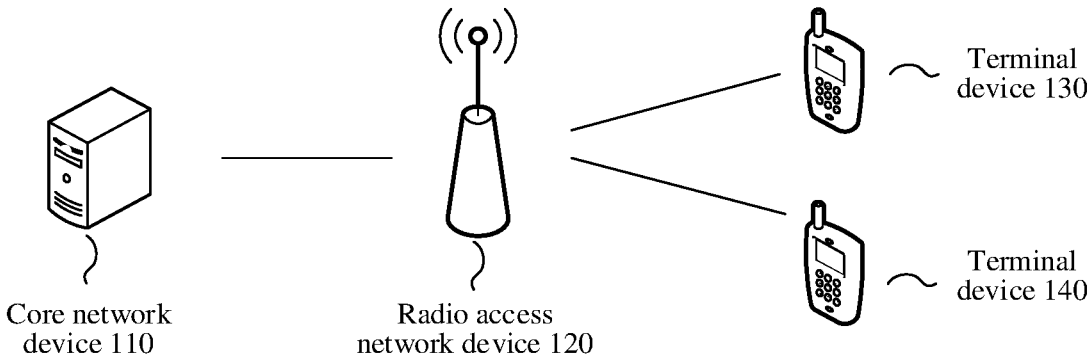
FIG. 1 is a schematic architectural diagram of a single-point transmission system to which an embodiment of this application is applicable.

To make the objectives, technical solutions, and advantages of this application clearer, the following further describes this application in detail with reference to the accompanying drawings.

The following describes some terms in embodiments of this application, to facilitate understanding of a person skilled in the art.

(1) A terminal device may include a device that provides a user with voice and/or data connectivity, for example, may include a handheld device with a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a subscriber unit, a subscriber station, a mobile station, a mobile console (mobile), a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, computer built-in, or vehicle-mounted mobile apparatus, or a smart wearable device. For example, the terminal device may be a device such as a personal communications service (PCS) phone, a cordless phone, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that are dedicated to only one type of application function and need to collaboratively work with other devices such as smartphones, for example, various smart bands, smart helmets, or smart jewelry for monitoring physical signs.

The terminal device may alternatively be a vehicle-mounted module, a vehicle-mounted component, a vehicle-mounted chip, or a vehicle-mounted unit that is built in a vehicle as one or more components or units. The vehicle may use the vehicle-mounted module, a vehicle-mounted module assembly, the vehicle-mounted component, the vehicle-mounted chip, or the vehicle-mounted unit that is built in the vehicle to implement the method in this application.

(2) A network device includes, for example, an access network (AN) device, for example, a base station (for example, an access point), and may be a device that is in an access network and that communicates with a wireless terminal device over an air interface through one or more cells. The network device may be configured to mutually convert a received over-the-air frame and an Internet Protocol (IP) packet and serve as a router between the terminal device and a rest portion of the access network, where the rest portion of the access network may include an IP network. The network device may further coordinate attribute management of the air interface. For example, the network device may include an evolved NodeB (NodeB, eNB, or e-NodeB, evolved NodeB) in a long term evolution (LTE) system or an LTE-advanced (LTE-Advanced, LTE-A) system, or may include a next generation NodeB (gNB) in a fifth generation (5G) mobile communication technology new radio (NR) system, or may include a central unit (CU) and a distributed unit (DU) in a cloud radio access network (Cloud RAN) system. This is not limited in embodiments of this application.

For example, in a network structure, a radio access network device may be a CU node or a DU node, or an access network device including a CU node and a DU node. Specifically, the CU node is configured to support protocols such as radio resource control (RRC), a packet data convergence protocol (PDCP), and a service data adaptation protocol (SDAP). The DU node is configured to support a radio link control (RLC) layer protocol, a media access control (MAC) layer protocol, and a physical layer protocol.

It may be understood that, in embodiments of this application, a physical downlink shared channel (PDSCH), a physical downlink control channel (PDCCH), a physical uplink shared channel (PUSCH), and a physical uplink control channel (PUCCH) are merely examples of a downlink data channel, a downlink control channel, an uplink data channel, and an uplink control channel at a physical layer. In different systems and different scenarios, the data channel and the control channel may have different names. This is not limited in embodiments of this application.

The radio access network device and the terminal device in embodiments of this application may be deployed on land, including an indoor or outdoor device, a handheld device, or a vehicle-mounted device; or may be deployed on a water surface; or may be deployed on a plane, a balloon, or an artificial satellite in the air. Application scenarios of the network device and the terminal device are not limited in embodiments of this application.

It should be noted that the terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, including at least one means including one, two, or more, and there is no limitation on which is included. For example, including at least one of A, B, and C may mean including A, B, or C, including A and B, A and C, or B and C, or including A, B, and C. The term "and/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

Unless otherwise stated, ordinal numbers such as "first" and "second" mentioned in embodiments of this application are for distinguishing between a plurality of objects, but are not intended to limit a sequence, a time sequence, priorities, or importance of the plurality of objects. In addition, descriptions of "first" and "second" do not necessarily indicate that objects are different.

Embodiments of the present invention are applicable to a single-point transmission scenario (for example, a Single-TRP), and are also applicable to a multi-point transmission scenario (for example, a Multi-TRP), and any scenario derived from the single-point or multi-point transmission scenario.

FIG. 1 shows a communication system in a single-point transmission scenario to which an embodiment of this application is applicable. The communication system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless manner or a wired manner. The core network device and the radio access network device may be different physical devices that are independent of each other, or a function of the core network device and a logical function of the radio access network device may be integrated into a same physical device, or some functions of the core network device and some functions of the radio access network device may be integrated into one physical device. The terminal device may be located at a fixed position, or may be mobile.

To improve signal transmission reliability, a coordinated multi-point transmission (CoMP) mechanism may be used. When COMP transmission is used, a plurality of points (TRPs) or cells communicate with a same terminal device, and scheduling information and/or data are exchanged between the TRPs. This transmission mechanism can be used to improve data transmission reliability. Specifically, because the plurality of points have spatial isolation, correlation of transmission links from the plurality of points to a same terminal device is relatively low. In this case, if a transmission link is suddenly interrupted, or in other words, deep fading occurs suddenly, the terminal device can still receive a signal of another transmission link, thereby improving the signal transmission reliability.

Figure 2:
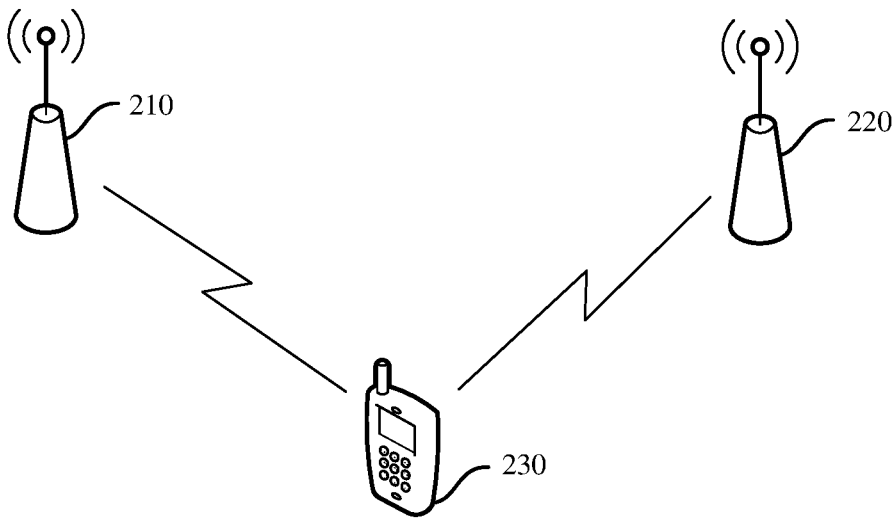
FIG. 2 is a schematic architectural diagram of a multipoint transmission system to which an embodiment of this application is applicable.

FIG. 2 shows a communication system in a multi-point transmission scenario in which a COMP transmission mechanism is used and to which an embodiment of this application is applicable. The communication system includes a network device 210, a network device 220, and at least one terminal device (for example, a terminal device 230 in FIG. 1). The terminal device is connected to the network device 210 and the network device 220 in a wireless manner, and the network device 210 and the network device 220 may simultaneously provide a service for the terminal device 230. The network device may include a scheduling device and a sending device. A function of the scheduling device may include: configuring uplink and downlink resources, and/or sending downlink control information (DCI) in a base station scheduling mode; and a function of the sending device may include: sending a downlink signal and receiving an uplink signal. The scheduling device and the sending device may be disposed in an integrated manner or may be disposed independently. For example, the scheduling device includes but is not limited to an LTE base station eNB and/or an NR base station gNB, and the sending device includes but is not limited to a transmission reception point TRP or a remote radio head RRH. The terminal device may receive a downlink/sidelink signal and/or send an uplink/sidelink signal.

FIG. 1 and FIG. 2 are merely schematic diagrams. The communication system may further include another network device, for example, may further include a wireless relay device and a wireless backhaul device, which are not drawn in FIG. 1 and FIG. 2. Quantities of core network devices, radio access network devices, and terminal devices included in the communication system are not limited in embodiments of this application.

According to the foregoing network system to which this application is applicable, the network device sends, to the terminal device, DCI for downlink scheduling, and the terminal device detects the DCI based on a PDCCH monitoring occasion. The DCI carries indication information for scheduling a PDSCH/transport block (TB), for example, a time-frequency resource indication of the PDSCH. The DCI further carries indication information indicating a HARQ-ACK feedback moment and PUCCH resource indicator PRI (PUCCH resource indicator) carrying HARQ-ACK feedback information. A base station may flexibly coordinate, by using the two pieces of indication information, resources used for reporting a HARQ-ACK, for example, select a resource size according to a quantity of bits of the HARQ-ACK, and select a time-frequency location of a resource according to a current channel state. The terminal device determines, by demodulating the PDSCH, whether a transport block (TB) carried by the PDSCH is correctly received, and reports information about whether the transport block (TB) is correctly received to the network device, where the report is referred to as HARQ-ACK feedback information or a HARQ-ACK codebook. For example, feeding back a NACK indicates that corresponding data is not correctly received and needs to be retransmitted by the network device, and feeding back an ACK indicates that corresponding data is correctly received. The HARQ-ACK feedback information may be carried on a PUSCH or a PUCCH. An indication of the HARQ-ACK feedback moment is indicated relative to an end moment of PDSCH scheduling. For example, if the end moment of PDSCH scheduling is k0, and the DCI indicates that a HARQ-ACK feedback delay is k1, an actual HARQ-ACK feedback moment is k0+k1.

One time of PDSCH scheduling may correspond to one or more HARQ-ACK bits. For example, if a plurality of codewords (CWs) in one time of PDSCH scheduling separately correspond to one transport block (TB), each CW may correspond to one HARQ-ACK bit; or one time of PDSCH scheduling includes a plurality of code blocks (CBs), and each CB corresponds to one HARQ-ACK bit, so as to enable CW-level or CB-level retransmission.

A plurality of times of PDSCH scheduling may be jointly fed back. To be specific, one PUCCH is used to carry HARQ-ACK feedback information of the plurality of times of PDSCH scheduling. In this case, one HARQ-ACK codebook (that is, one HARQ-ACK bit sequence) is carried on the PUCCH, and different bits in the codebook correspond to different PDSCH scheduling. For example, if one PDSCH is scheduled at a moment 1 and a moment 2, and a PUCCH is scheduled to carry a HARQ-ACK codebook at a moment 3, the HARQ-ACK codebook includes at least 2 bits, where one bit corresponds to PDSCH scheduling at the moment 1, and a value of the bit indicates a receiving status of a TB carried by the PDSCH scheduled at the moment 1; and the other bit corresponds to PDSCH scheduling at the moment 2, and a value of the bit indicates a receiving status of a TB carried by the PDSCH scheduled at the moment 2.

Figures 3, 4:
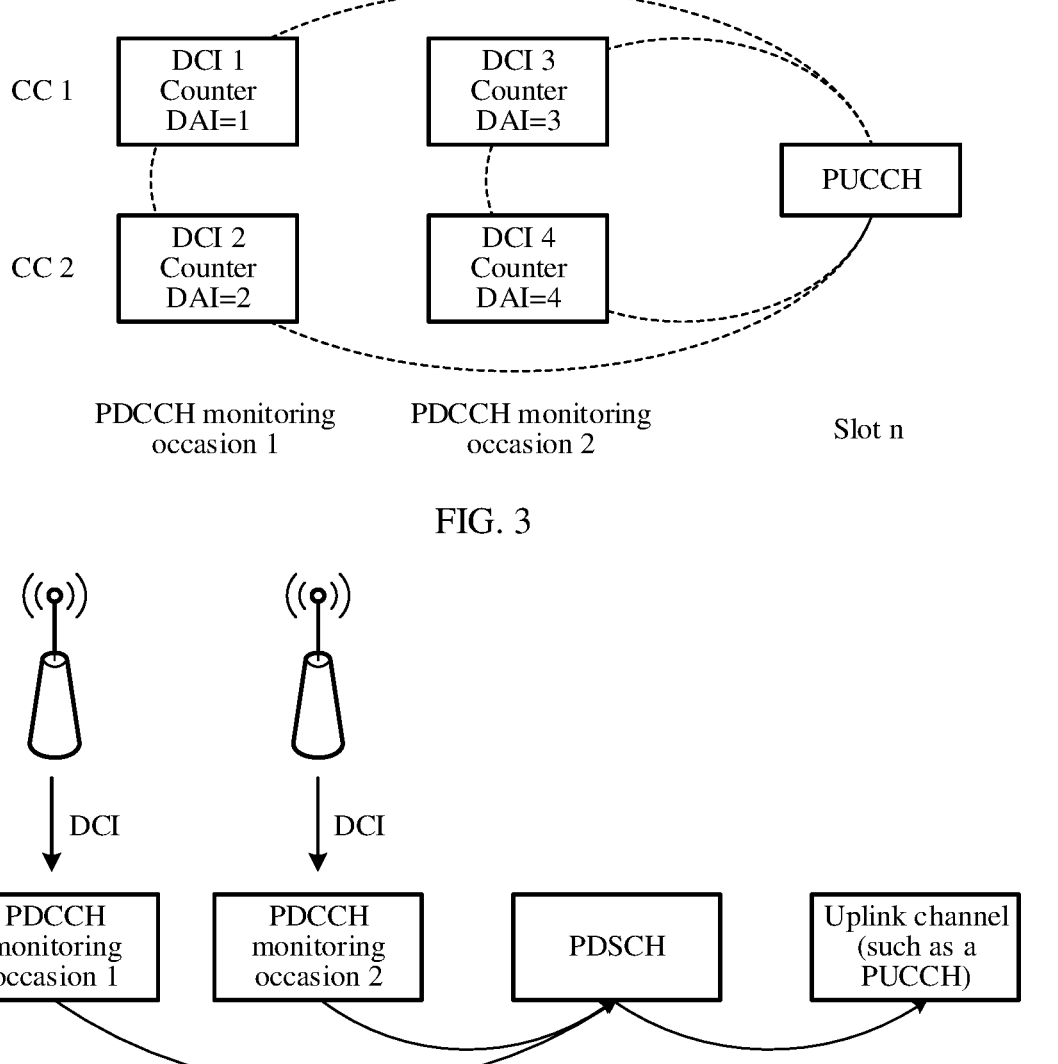
FIG. 3 and FIG. 4 are respectively schematic diagrams of joint feedback according to an embodiment of this application.

A correspondence between a bit in the HARQ-ACK codebook and a PDSCH and a quantity of bits in the codebook are both determined based on indication information carried in the DCI. Specifically, a group of one or more pieces of DCI indicating a same HARQ-ACK feedback moment are first determined as a group of DCI, and a protocol specifies a sorting rule of DCI in the group of DCI. A same feedback moment may be at a slot (slot) level or a sub-slot (sub-slot) level. For example, if HARQ-ACK feedback moments indicated by two pieces of DCI are in a same slot or sub-slot, the two pieces of DCI are a same group of DCI. The terminal device receives the DCI on each PDCCH monitoring occasion and determines a corresponding HARQ-ACK feedback moment, to determine a group of DCI from the DCI. As shown in FIG. 3 and FIG. 4, there are a PDCCH monitoring occasion 1 and a PDCCH monitoring occasion 2 before a PUCCH sending moment, and DCI may be simultaneously delivered on different component carriers (CCs) on a same PDCCH monitoring occasion. For example, one piece of DCI is separately sent on a CC 1 and a CC 2. In this way, four pieces of DCI are sent in total, and feedback moments indicated by the four pieces of DCI are all a slot n. Therefore, the four pieces of DCI are a group of DCI, and the four pieces of DCI are jointly fed back, that is, PDSCHs scheduled by the four pieces of DCI on the two PDCCH monitoring occasions are fed back by using a same HARQ-ACK codebook, and the HARQ-ACK codebook is fed back on a PUCCH in the slot n indicated by the DCI.

After a group of DCI that needs to be jointly fed back is determined, a HARQ-ACK bit arrangement corresponding to PDSCHs scheduled by the group of DCI further needs to be determined, for example, an arrangement order of HARQ-ACK bits corresponding to four pieces of DCI in the HARQ-ACK codebook in FIG. 3. Specifically, a bit sequence, in the HARQ-ACK codebook, of the HARQ-ACK bits of the PDSCHs scheduled by the DCI may be determined based on a downlink assignment index (DAI) indication carried in the DCI. Generally, the DAI indication is related to an order of the DCI, so that the terminal device determines DCI that is not detected, and consequently, a quantity of HARQ-ACK bits and arrangement are not controlled by the base station. The DAI indication is classified into a counter DAI indication and a total DAI indication. The counter DAI indication is increased sequentially by 1 in ascending order of DCI, and the total DAI indication is determined based on a quantity of all DCI sent on a PDCCH monitoring occasion on which a current DAI indication is located and a previous PDCCH monitoring occasion in a group of DCI. For example, in FIG. 3, if values of the counter DAI indications carried in the DCI 1 to the DCI 4 are respectively 1 to 4, four bits in the HARQ-ACK codebook are sequentially corresponding to demodulation results of PDSCHs scheduled by the DCI 1 to the DCI 4. In FIG. 3, a total DAI in the DCI 1 and the DCI 2 is 2, and a total DAI in the DCI 3 and the DCI 4 is 4. If the DCI 1 is missed by the terminal device, but the terminal device receives the DCI 2, the terminal device may learn of, based on a value of the total DAI indication carried in the DCI 2, that the terminal device misses detecting the DCI 1. Therefore, the first bit in the HARQ-ACK codebook fed back by the terminal device corresponds to the missed DCI 1, and a value of the first bit is a NACK. Generally, when a quantity of configured component carriers is greater than 1, the DCI carries the total DAI indication; otherwise, the DCI carries only the counter DAI indication.

A sorting manner of DCI in a group of DCI that needs to be jointly fed back is: on a same PDCCH monitoring occasion, the DCI is first sorted in ascending order of component carrier index values, and then the DCI is sorted in ascending order of PDCCH monitoring occasion index values, that is, the PDCCH monitoring occasion time is sorted from front to back. As shown in FIG. 3, the DAI indications of the DCI 1 to the DCI 4 are determined based on a DCI sorting rule.

A PUCCH resource may be determined based on DCI sorting. In a group of DCI that needs to be jointly fed back, each DCI may indicate a PUCCH resource because the network device adjusts a format and/or a size of a PUCCH resource based on a quantity of HARQ-ACK bits to be fed back at a current scheduling moment. For example, on the PDCCH monitoring occasion 1, the base station determines that the PUCCH resource is for carrying a 2-bit HARQ-ACK codebook, and uses a format 0; and on the PDCCH monitoring occasion 2, the base station determines that the PUCCH resource is for carrying a 4-bit HARQ-ACK codebook, and uses a format 3. However, only one PUCCH resource indication in a group of DCI takes effect (joint feedback). In this case, it is agreed that a PUCCH resource is determined based on the last piece of DCI, and the last piece of DCI is the last piece of DCI determined based on the foregoing DCI sorting.

PDCCH reliability can be improved by using coordinated multi-point transmission. A plurality of points repeatedly send, on a plurality of PDCCH monitoring occasions, DCI for scheduling a same PDSCH, or in other words, the plurality of pieces of DCI are for scheduling a same transport block (TB), to improve DCI receiving reliability, thereby improving PDSCH reliability.

Currently, the coordinated multi-point transmission may use multiple chance DCI transmission. The terminal device independently detects, demodulates, and decodes DCI on a PDCCH monitoring occasion configured by the network device. In other words, the terminal device does not perceive repeated DCI sending. A plurality of pieces of DCI schedule a same PDSCH or TB, and the plurality of pieces of DCI may correspond to a same HARQ-ACK bit, to reduce feedback overheads. Indication information bits of the plurality of pieces of DCI and encoding manners of the DCI may be different. For example, different pieces of DCI indicate different time-frequency resources, different beamforming manners, or the like. Alternatively, the DCI 1 uses an aggregation level 2, and the DCI 2 uses an aggregation level 4. The aggregation level represents a size of a physical resource occupied by the DCI, and when a quantity of bits of the DCI is the same, a higher aggregation level indicates a lower bit rate. This mechanism can resolve the problem that the PDSCH cannot receive data when one transmission link is interrupted. However, HARQ-ACK feedback moments indicated by the plurality of pieces of DCI are the same, so that HARQ-ACK bits corresponding to the plurality of pieces of DCI are the same.

Figure 5:
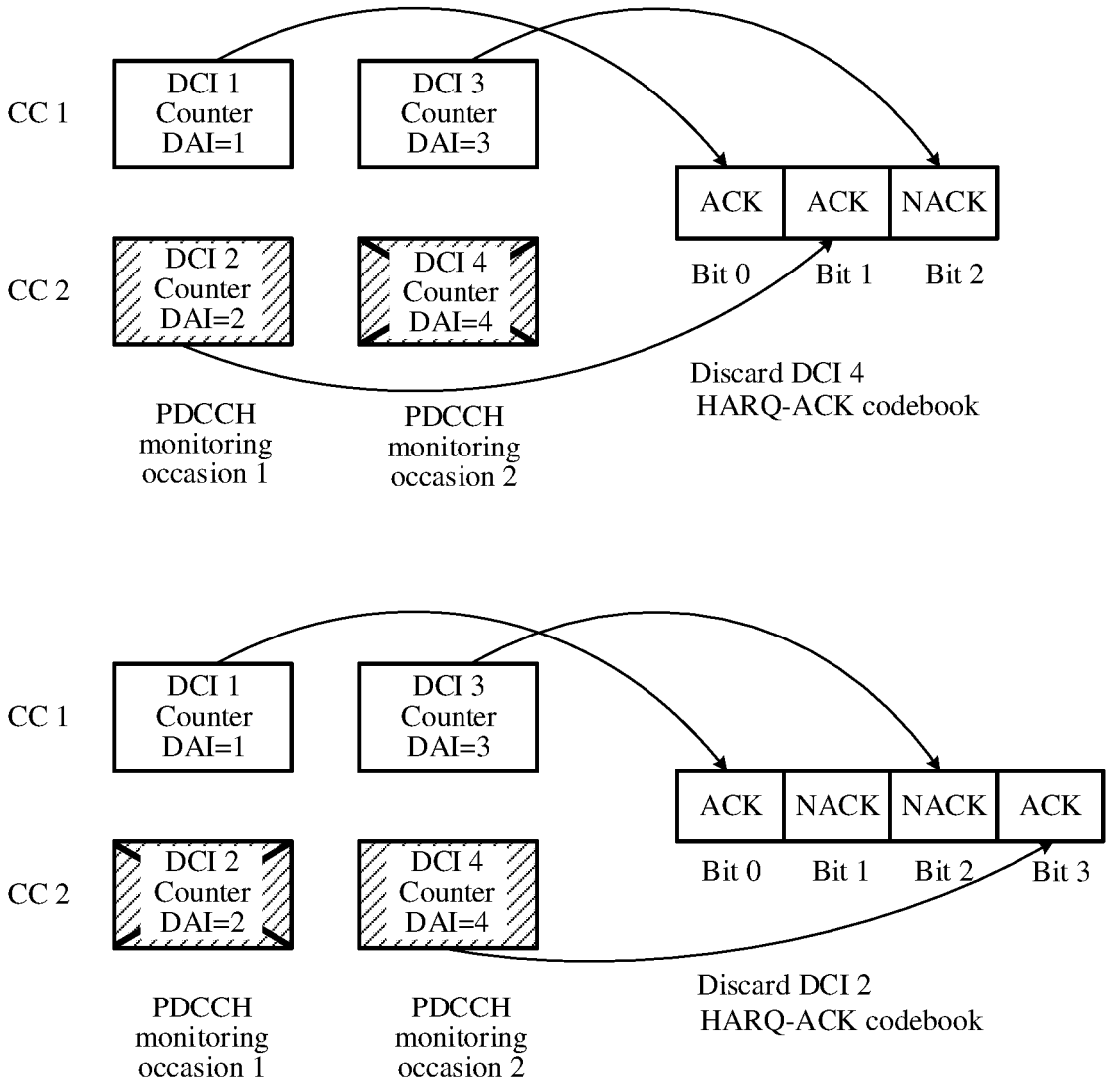

Using the foregoing mechanism may lead to a problem that the network device cannot correctly receive the HARQ-ACK codebook. As shown in FIG. 5, if the terminal device detects four pieces of DCI on a PDCCH monitoring occasion 1 and a PDCCH monitoring occasion 2, the four pieces of DCI are a group of DCI that needs to be jointly fed back, and DCI 2 and DCI 4 schedule a same PDSCH, detection results of the terminal device for the DCI 2 and the DCI 4 may cause different HARQ-ACK codebooks. Consequently, the network device cannot interpret the HARQ-ACK codebook. Specifically, as shown in FIG. 5, if the terminal device detects the DCI 2 and the DCI 4, determines that the DCI 2 and the DCI 4 indicate that a same TB is scheduled, and chooses to determine a HARQ-ACK feedback based on the DCI 2 and discard the DCI 4, or the terminal device detects only the DCI 2, the HARQ-ACK codebook includes three bits, which sequentially correspond to HARQ-ACK feedback information of PDSCHs scheduled by DCI 1, the DCI 2, and DCI 3. If the terminal device detects the DCI 2 and the DCI 4, determines that the DCI 2 and the DCI 4 indicate that a same TB is scheduled, and chooses to determine a HARQ-ACK feedback based on the DCI 4 and discard the DCI 2, or the terminal device detects only the DCI 4, the terminal device determines, based on the DAI indication, that the HARQ-ACK codebook includes four bits, where a bit 0, a bit 2, and a bit 3 sequentially correspond to HARQ-ACK feedback information of PDSCHs scheduled by the DCI 1, the DCI 3, and the DCI 4; and the DCI 2 corresponding to a bit 1 is discarded, so that a value of the bit 1 is a NACK. Because the network device cannot learn of a DCI detection result of the terminal device, the network device cannot correctly interpret the HARQ-ACK codebook.

As shown in FIG. 6, if the terminal device detects six pieces of DCI on a PDCCH monitoring occasion 1, a PDCCH monitoring occasion 2, and a PDCCH monitoring occasion 3, the six pieces of DCI are a group of DCI that needs to be jointly fed back, DCI 2 and DCI 6 schedule a same PDSCH, and DCI 3 and DCI 5 schedule a same PDSCH, detection results of the terminal device for the DCI 2 and the DCI 6 or detection results for the DCI 3 and the DCI 5 may cause different HARQ-ACK codebooks. Consequently, the network device cannot interpret the HARQ-ACK codebook. In one case, if the terminal device detects the DCI 2 and the DCI 6, determines that the DCI 2 and the DCI 6 indicate that a same TB is scheduled, and chooses to determine a HARQ-ACK feedback based on the DCI 2 and discard the DCI 6, or the terminal device detects only the DCI 2, detects the DCI 3 and the DCI 5, determines that the DCI 3 and the DCI 5 indicate that a same TB is scheduled, and chooses to determine a HARQ-ACK feedback based on the DCI 3 and discard the DCI 5, or the terminal device detects only the DCI 3, the terminal device determines, based on the DAI indication, that the HARQ-ACK codebook includes four bits, which sequentially correspond to HARQ-ACK feedback information of PDSCHs scheduled by DCI 1, the DCI 2, the DCI 3, and DCI 4. In another case, if the terminal device detects the DCI 2 and the DCI 6, determines that the DCI 2 and the DCI 6 indicate that a same TB is scheduled, and chooses to determine a HARQ-ACK feedback based on the DCI 6 and discard the DCI 2, or the terminal device detects only the DCI 2, detects the DCI 3 and the DCI 5, determines that the DCI 3 and the DCI 5 indicate that a same TB is scheduled, and chooses to determine a HARQ-ACK feedback based on the DCI 6 and discard the DCI 3, or the terminal device detects only the DCI 3, the terminal device determines, based on the DAI indication, that the HARQ-ACK codebook includes six bits, where a bit 0, a bit 3, a bit 4, and a bit 5 sequentially correspond to HARQ-ACK feedback information of PDSCHs scheduled by the DCI 1, the DCI 4, the DCI 5, and the DCI 6; and the DCI 2 and the DCI 3 corresponding to a bit 1 and a bit 2 are discarded, so that values of both the bit 1 and the bit 2 are a NACK. Because the network device cannot learn of a DCI detection result of the terminal device, the network device cannot correctly interpret the HARQ-ACK codebook.

To enable the network device to correctly receive HARQ-ACK feedback information, embodiments of this application provide a communication method and an apparatus thereof. When a plurality of pieces of DCI schedule a same transport block (TB), it can be ensured that the network device can correctly receive HARQ-ACK feedback information, that is, a correspondence between a bit in a HARQ-ACK codebook and a PDSCH that is obtained by the network device based on the HARQ-ACK codebook is consistent with a correspondence between a bit in a HARQ-ACK codebook and a PDSCH that is fed back by the terminal device. In this way, the HARQ-ACK feedback information is correctly received.

FIG. 7 is a schematic flowchart of an example of a communication method implemented on a terminal device side according to an embodiment of this application.

As shown in the figure, the procedure may include the following steps.

S701. A terminal device detects first DCI on a first PDCCH monitoring occasion, and detects second DCI on a second PDCCH monitoring occasion.

Optionally, the first DCI and the second DCI are for scheduling a same transport block (TB), and the first DCI and the second DCI carry a same DAI indication. It should be understood that, that the first DCI and the second DCI carry a same DAI indication means that a value of the DAI indication in the first DCI is the same as a value of the DAI indication in the second DCI.

That the first DCI and the second DCI are for scheduling a same transport block (TB) may be understood as that PDSCHs scheduled by the first DCI and the second DCI carry a same transport block (TB). It should be understood that, when successfully detecting the first DCI and the second DCI, the terminal device may determine, based on that HARQ process indications and new data indicators (new data indicators, NDIs) that are carried in the first DCI and the second DCI indicate a same value, that the two pieces of DCI are for scheduling a same TB. It should be further understood that a case in which the terminal device detects only the first DCI or the second DCI is not excluded in this application.

Optionally, before detecting the first DCI and the second DCI, the terminal device receives PDCCH monitoring occasion configuration information, where the configuration information indicates that the first PDCCH monitoring occasion and the second PDCCH monitoring occasion have an association relationship, and the association relationship indicates that DCI detected on the first PDCCH monitoring occasion and DCI detected on the second PDCCH monitoring occasion are for scheduling a same TB. In this case, it may be determined, based on the configuration information, that the first DCI and the second DCI are for scheduling the same TB. Based on the PDCCH monitoring occasion configuration information, when the terminal device detects only the second DCI or discards the first DCI, the terminal device and a network device have a consistent understanding of the HARQ-ACK codebook, thereby ensuring transmission reliability.

Optionally, a transmission mechanism of the first DCI on the first PDCCH monitoring occasion and the second DCI on the second PDCCH monitoring occasion is multiple chance DCI transmission. That is, information bits or encoding manners indicated by the first DCI and the second DCI may not be completely the same. The terminal device independently detects and demodulates the DCI, but performs joint decoding on each monitoring occasion of the PDCCH monitoring occasion configured by the network device. For example, the terminal device obtains a plurality of pieces of demodulated soft information through a plurality of PDCCH monitoring occasions, and combines the plurality of pieces of soft information for decoding, thereby equivalently improving a signal-to-noise ratio (sSNR) of DCI receiving, and improving DCI receiving reliability.

In another example, a transmission mechanism of the first DCI on the first PDCCH monitoring occasion and the second DCI on the second PDCCH monitoring occasion is repeated DCI transmission, and the terminal device needs to perceive repeated DCI transmission. Specifically, an association relationship between PDCCH candidates (a PDCCH detection unit, where one PDCCH candidate corresponds to one DCI detection process, and corresponds to a specific time-frequency resource for carrying DCI) on different PDCCH monitoring occasions may be agreed in advance. The terminal device determines a sending location of the repeated DCI based on the association relationship, to detect and demodulate the DCI, and perform soft combining and decoding operations on the associated PDCCH candidates respectively. The soft combining operation requires that indication information (original bits) of repeatedly transmitted DCI and encoded bits are completely the same. For example, DCI information has a same quantity of bits, same indication content, and a same aggregation level.

Optionally, higher layer signaling indicates that current DCI transmission is one of a multiple chance DCI transmission mode and a repeated DCI transmission mode.

Optionally, HARQ-ACK codebook generation mechanisms in the foregoing two DCI transmission modes are the same.

Optionally, the first DCI and the second DCI correspond to a same search space set. In this case, the first PDCCH monitoring occasion and the second PDCCH monitoring occasion that are in PDCCH monitoring occasions configured for the search space set may be determined based on a preset criterion. For example, the first PDCCH monitoring occasion is an odd-numbered PDCCH monitoring occasion in the PDCCH monitoring occasions configured for the search space set, and the second PDCCH monitoring occasion is an even-numbered PDCCH monitoring occasion in the PDCCH monitoring occasions configured for the search space set. In this manner, configurations of the search space set may be saved.

Optionally, the first DCI and the second DCI correspond to different search space sets. For example, the first DCI corresponds to a first search space set, and the second DCI corresponds to a second search space set. In this case, a PDCCH monitoring occasion configured for the first search space set is the first PDCCH monitoring occasion, and a PDCCH monitoring occasion configured for the second search space set is the second PDCCH monitoring occasion. In this manner, flexible configurations of search space sets of two TRPs may be supported.

Optionally, index values of PDCCH monitoring occasions of the first DCI and the second DCI are determined. For example, the index values of the PDCCH monitoring occasion are increased sequentially in a time order. For example, in this embodiment of this application, if the first PDCCH monitoring occasion is earlier than the second PDCCH monitoring occasion, the index value of the first PDCCH monitoring occasion is less than the index value of the second PDCCH monitoring occasion; or if the second PDCCH monitoring occasion is earlier than the first PDCCH monitoring occasion, the index value of the first PDCCH monitoring occasion is greater than the index value of the second PDCCH monitoring occasion. The first PDCCH monitoring occasion and/or the second PDCCH monitoring occasion may include one or more component carriers for transmitting DCI. Optionally, the first DCI and the second DCI may be located on a same component carrier, or located in a same bandwidth part (bandwidth part, BWP).

Optionally, the first DCI and the second DCI may respectively carry a counter DAI (counter DAI) indicator and a total DAI (total DAI) indication, where values of the counter DAI indications carried in the first DCI and the second DCI are the same. Further, values of the total DAI indications carried in the first DCI and the second DCI are also the same.

Optionally, the DAI indications (for example, the counter DAI indication and the total DAI indication) carried in the first DCI and the second DCI are determined based on the first PDCCH monitoring occasion. That the DAI indications carried in the first DCI and the second DCI are determined based on the first PDCCH monitoring occasion may be understood as follows: The DAI indications carried in the first DCI and the second DCI need to be determined based on orders of the first DCI and the second DCI in a group of DCI. The group of DCI indicates that HARQ-ACKs are fed back at a same moment. An order of DCI needs to be determined based on an index value of a corresponding PDCCH monitoring occasion. Because DAIs indicated by the first DCI and the second DCI are the same, a PDCCH monitoring occasion needs to be agreed for determining values of the DAI indications. In this embodiment of this application, the index value of the first PDCCH monitoring occasion corresponding to the first DCI is agreed. In this way, it can be ensured that HARQ-ACK codebooks determined based on any one of the first DCI and the second DCI are the same.

Specifically, on the network device side, the first PDCCH monitoring occasion may be used as a reference monitoring occasion, and the network device sorts DCI sent on the first PDCCH monitoring occasion and the second PDCCH monitoring occasion, and determines, based on an order of DCI on the reference monitoring occasion, the values of the DAI indications carried in the first DCI and the second DCI. The system may pre-agree that the first PDCCH monitoring occasion is used as the reference monitoring occasion, or in another manner, the terminal device can learn of a PDCCH monitoring occasion used as the reference monitoring occasion. On the terminal device side, the first PDCCH monitoring occasion may be used as the reference monitoring occasion, and the HARQ-ACK codebook is determined based on the value of the DAI indication and the first PDCCH monitoring occasion.

For example, as shown in FIG. 8, DCI is delivered on a PDCCH monitoring occasion 1 and a PDCCH monitoring occasion 2 in the foregoing multiple chance DCI transmission mode or repeated DCI transmission mode, and the DCI is collectively referred to as repeatedly transmitted DCI in the following. In the figure, DCI transmitted on a component carrier 2 (CC 2) of the PDCCH monitoring occasion 1 and the PDCCH monitoring occasion 2 is repeatedly transmitted DCI, and schedules a same TB.

As shown in (a) in FIG. 8, four pieces of DCI transmitted on the PDCCH monitoring occasion 1 and the PDCCH monitoring occasion 2 correspond to a same HARQ-ACK feedback moment, that is, the four pieces of DCI are a group of DCI that needs to be jointly fed back. If it is agreed that values of DAI indications carried in the repeatedly transmitted DCI is determined based on the PDCCH monitoring occasion 1, the four pieces of DCI are sorted, and orders of the four pieces of DCI are as follows: DCI 1, DCI 2, DCI 3, and DCI 4. Using the PDCCH monitoring occasion 1 as a reference monitoring occasion means that values of the DAI indications carried in the DCI 2 and the DCI 4 are determined based on the order of the DCI 2 transmitted on the reference monitoring occasion. Because the order of the DCI 2 is 2, a value of a counter DAI indication carried in the DCI 2 is equal to 2, and a value of a total DAI indication thereof is also equal to 2. The DAI indication carried in the DCI 4 needs to be equal to the DAI indication carried in the DCI 2. Therefore, a value of a counter DAI indication carried in the DCI 4 is equal to 2, and a value of a total DAI indication thereof is equal to 2. It should be understood that the orders of the DCI 2 and the DCI 4 are the same. Alternatively, only the DCI 1, the DCI 2, and the DCI 3 may be sorted, and the DAI indication of the DCI 4 is directly determined based on the order of the DCI 2.

As shown in (b) in FIG. 8, if it is agreed that values of DAI indications carried in the repeatedly transmitted DCI is determined based on the PDCCH monitoring occasion 2, the four pieces of DCI are sorted, and orders of the four pieces of DCI are as follows: DCI 1, DCI 2, DCI 3, and DCI 4. Using the PDCCH monitoring occasion 2 as a reference monitoring occasion means that values of the DAI indications carried in the DCI 2 and the DCI 4 are determined based on the order of the DCI 4 transmitted on the reference monitoring occasion. Because the order of the DCI 4 is 4, a value of a counter DAI indication carried in the DCI 4 is equal to 4, and a value of a total DAI indication thereof is also equal to 4. The DAI indication carried in the DCI 2 needs to be equal to the DAI indication carried in the DCI 4. Therefore, a value of a counter DAI indication carried in the DCI 2 is equal to 4, and a value of a total DAI indication thereof is equal to 4. It should be understood that the orders of the DCI 2 and the DCI 4 are the same. Alternatively, only the DCI 1, the DCI 2, and the DCI 3 may be sorted, and the DAI indication of the DCI 2 is directly determined based on the order of the DCI 4.

For another example, as shown in FIG. 9, DCI is delivered on a PDCCH monitoring occasion 1, a PDCCH monitoring occasion 2, and a PDCCH monitoring occasion 3 in the foregoing multiple chance DCI transmission mode or repeated DCI transmission mode, and the DCI is collectively referred to as repeatedly transmitted DCI in the following. DCI 2 and DCI 6 schedule a TB 1, the DCI 2 and the DCI 6 are repeatedly transmitted DCI, DCI 3 and DCI 5 schedule a TB 2, and the DCI 3 and the DCI 5 are repeatedly transmitted DCI.

As shown in (a) in FIG. 9, if it is agreed that values of DAI indications carried in the repeatedly transmitted DCI 2 and DCI 6 are determined based on the PDCCH monitoring occasion 1 in which the DCI 2 is located, because an order of the DCI 2 on the PDCCH monitoring occasion 1 in the six pieces of DCI is 2, a value of a counter DAI indication is equal to 2, and a value of a total DAI indication is equal to 2. Therefore, the value of the counter DAI indication carried in the DCI 2 on the PDCCH monitoring occasion 1 and a value of a counter DAI indication carried in the DCI 6 on the PDCCH monitoring occasion 3 are equal to 2, and a value of a total DAI indication thereof is equal to 2. If it is agreed that values of DAI indications carried in the repeatedly transmitted DCI 3 and DCI 5 are determined based on the PDCCH monitoring occasion 2 in which the DCI 6 is located, because an order of the DCI 3 on the PDCCH monitoring occasion 2 in the six pieces of DCI is 3, a value of a counter DAI indication is equal to 3, and a value of a total DAI indication is equal to 4. Therefore, the value of the counter DAI indication carried in DCI 3 on the PDCCH monitoring occasion 2 and a value of a counter DAI indication carried in the DCI 5 on the PDCCH monitoring occasion 3 are equal to 3, and a value of a total DAI indication thereof is equal to 4. It should be understood that the orders of the DCI 2 and the DCI 6 are the same, and the orders of the DCI 3 and the DCI 5 are the same. Alternatively, only the DCI 1, the DCI 2, the DCI 3, and the DCI 4 may be sorted, the DAI indication of the DCI 6 is directly determined based on the order of the DCI 2, and the DAI indication of the DCI 5 is directly determined based on the order of the DCI 3.

As shown in (b) in FIG. 9, if it is agreed that values of the DAI indications carried in the repeatedly transmitted DCI 2 and DCI 6 are determined based on the PDCCH monitoring occasion 3 in which the DCI 6 is located, because an order of the DCI 6 on the PDCCH monitoring occasion 3 in the six pieces of DCI is 6, a value of a counter DAI indication is equal to 6, and a value of a total DAI indication is equal to 6. Therefore, the value of the counter DAI indication carried in the DCI 2 on the PDCCH monitoring occasion 1 and a value of a counter DAI indication carried in the DCI 6 on the PDCCH monitoring occasion 3 are equal to 6, and a value of a total DAI indication thereof is equal to 6. If it is agreed that values of DAI indications carried in the repeatedly transmitted DCI 3 and DCI 5 are determined based on the PDCCH monitoring occasion 3 in which the DCI 5 is located, because an order of the DCI 5 on the PDCCH monitoring occasion 3 in the six pieces of DCI is 5, a value of a counter DAI indication is equal to 5, and a value of a total DAI indication is equal to 6. Therefore, a value of a counter DAI indication carried in the DCI 3 on the PDCCH monitoring occasion 2 and the value of the counter DAI indication carried in the DCI 5 on the PDCCH monitoring occasion 3 are equal to 5, and a value of a total DAI indication thereof is equal to 6. It should be understood that the orders of the DCI 2 and the DCI 6 are the same, and the orders of the DCI 3 and the DCI 5 are the same. Alternatively, only the DCI 1, the DCI 4, the DCI 5, and the DCI 6 may be sorted, the DAI indication of the DCI 2 is directly determined based on the order of the DCI 6, and the DAI indication of the DCI 3 is directly determined based on the order of the DCI 5.

It should be noted that, in this embodiment of this application, the DAI indication or the value of the DAI indication may be understood as a value of a DAI. According to a protocol, the DAI carried in the DCI occupies two bits, and the value of the DAI ranges from 0 to 3. When a quantity of pieces of DCI exceeds 4, the value of the DAI is cyclically used. For example, if a quantity of a group of DCI that needs to be jointly fed back is 6, a value of a counter DAI carried in the first DCI is equal to 0, a value of a counter DAI carried in the second DCI is equal to 1, a value of a counter DAI carried in the third DCI is equal to 2, a value of a counter DAI carried in the fourth DCI is equal to 3, a value of a counter DAI carried in the fifth DCI is equal to 0, and a value of a counter DAI carried in the sixth DCI is equal to 1. The terminal device may determine an order of each DCI based on the value of the DAI and an index value of a PDCCH monitoring occasion in which the DCI is located (that is, a sequence of PDCCH monitoring occasions). In other words, the terminal device may determine an order of the DCI indicated by the counter DAI carried in each DCI.

The DAI indication or the value of the DAI indication may also be understood as an order of DCI indicated by the DAI, as shown in FIG. 9. The terminal device may determine an order of the DCI based on the value of the DAI and an index value of a PDCCH monitoring occasion in which each DCI is located (that is, a sequence of PDCCH monitoring occasions).

S702. The terminal device generates a HARQ-ACK codebook based on the first PDCCH monitoring occasion and a DAI indication carried in at least one of the first DCI and the second DCI.

In this step, the terminal device determines, based on the first PDCCH monitoring occasion and the DAI indication carried in at least one of the first DCI and the second DCI, a bit that is of a HARQ-ACK bit corresponding to the TB scheduled by the first DCI and/or the second DCI and that is in the HARQ-ACK codebook.

Optionally, the terminal device generates the HARQ-ACK codebook based on the DAI indication carried in the second DCI and the first PDCCH monitoring occasion. A location of the HARQ-ACK bit corresponding to the second DCI in the HARQ-ACK codebook is determined based on the DAI indication and the first PDCCH monitoring occasion.

The first DCI and the second DCI correspond to a same bit in the HARQ-ACK codebook. It should be understood that, if the terminal device detects both the first DCI and the second DCI, the terminal device may receive a PDSCH based on the first DCI and the second DCI, and determine, based on at least one DAI indication and the first PDCCH monitoring occasion, a HARQ-ACK codebook corresponding to the PDSCH; or may receive a PDSCH based on one piece of DCI in the first DCI or the second DCI, for example, the second DCI, and determine, based on the DAI indication in the second DCI and the first PDCCH monitoring occasion, a HARQ-ACK codebook corresponding to the PDSCH. If the terminal device detects only the second DCI, the terminal device receives a PDSCH based on the second DCI, and determines, based on the DAI indication in the second DCI and the first PDCCH monitoring occasion, a HARQ-ACK codebook corresponding to the PDSCH.

When generating the HARQ-ACK codebook, the terminal device determines, based on the first PDCCH monitoring occasion and a value of the DAI indication carried in at least one of the first DCI and the second DCI, a bit of a HARQ-ACK bit corresponding to the TB scheduled by the first DCI and the second DCI in the HARQ-ACK codebook, so that bits corresponding to the scheduled TB determined based on the value of the DAI indication carried in the first DCI and the value of the DAI indication carried in the second DCI are the same, thereby ensuring that the generated HARQ-ACK can be correctly decoded by the network side.

Optionally, index values of the first PDCCH monitoring occasion and the second PDCCH monitoring occasion are determined based on the PDCCH monitoring occasion configuration information, and one of the first PDCCH monitoring occasion and the second PDCCH monitoring occasion is preset, to determine a PDCCH monitoring occasion for generating the HARQ-ACK codebook corresponding to the first DCI and the second DCI. For example, it is agreed in advance that a HARQ-ACK codebook is determined and generated based on a PDCCH monitoring occasion with a smaller index value in the first PDCCH monitoring occasion and the second PDCCH monitoring occasion, and it is determined, based on the PDCCH monitoring occasions corresponding to the first DCI and the second DCI, that the first PDCCH monitoring occasion is earlier than the second PDCCH monitoring occasion, so that the HARQ-ACK codebook corresponding to the first DCI and the second DCI is generated based on the first PDCCH monitoring occasion. In another example, when the first PDCCH monitoring occasion is an odd-numbered monitoring occasion in PDCCH monitoring occasions configured for a search space set, and the second PDCCH monitoring occasion is an even-numbered monitoring occasion in the PDCCH monitoring occasions configured for the search space set, it may be agreed in advance that the HARQ-ACK codebook is determined based on the odd-numbered monitoring occasion.

Optionally, the first PDCCH monitoring occasion may be understood as a monitoring occasion configured for a first search space set, and the second PDCCH monitoring occasion may be understood as a monitoring occasion configured for a second search space set.

S703. The terminal device sends the HARQ-ACK codebook. The HARQ-ACK codebook may be carried on a PUCCH, or may be carried on a PUSCH.

It should be noted that, in the foregoing procedure, in S701, that the terminal device detects the first DCI on the first PDCCH monitoring occasion and detects the second DCI on the second PDCCH monitoring occasion may have the following cases:

Case 1: The terminal device detects only the first DCI on the first PDCCH monitoring occasion.

In this case, in S702, the terminal device may generate the HARQ-ACK codebook based on the DAI indication carried in the detected first DCI and the first PDCCH monitoring occasion.

Case 2: The terminal device detects only the second DCI on the second PDCCH monitoring occasion.

In this case, in S702, the terminal device may generate the HARQ-ACK codebook based on the DAI indication carried in the detected second DCI and the first PDCCH monitoring occasion.

Case 3: The terminal device detects the first DCI on the first PDCCH monitoring occasion, and detects the second DCI on the second PDCCH monitoring occasion.

In this case, in S702, the terminal device may generate the HARQ-ACK codebook based on the DAI indication carried in the detected first DCI and the first PDCCH monitoring occasion, or may generate the HARQ-ACK codebook based on the DAI indication carried in the detected second DCI and the first PDCCH monitoring occasion.

In the foregoing embodiment of this application, the DAI indications carried in the first DCI and the second DCI that are for scheduling a same transport block have a same value, and the terminal device generates the HARQ-ACK codebook based on the DAI indication and the first PDCCH monitoring occasion. Therefore, bits corresponding to the scheduled TBs determined by the terminal device based on both the DAI indication carried in the first DCI and the DAI indication carried in the second DCI are the same, thereby ensuring that a generated HARQ-ACK can be correctly decoded by a network side.

In some embodiments of this application, the terminal device may generate the HARQ-ACK codebook in the following manner: A group of DCI that needs to be jointly fed back is first determined. If the group of DCI includes repeatedly transmitted DCI, when the HARQ-ACK codebook is generated, a PDCCH monitoring occasion (for example, a first PDCCH monitoring occasion in PDCCH monitoring occasions in which the group of DCI is located) corresponding to the repeatedly transmitted DCI is used for a generation process of the HARQ-ACK codebook, and a remaining PDCCH monitoring occasion in the repeatedly transmitted DCI is not used in the generation process of the HARQ-ACK codebook. When only one piece of DCI is detected in the repeatedly transmitted DCI, the DCI and an agreed PDCCH monitoring occasion are for generating a HARQ-ACK codebook.

In a group of DCI, only one piece of DCI in repeatedly transmitted DCI (DCI for scheduling a same TB) can participate in generating a HARQ-ACK codebook, and all non-repeatedly transmitted DCI participates in generating a HARQ-ACK codebook. Therefore, when the HARQ-ACK codebook is generated based on all the DCI that participates in generating the HARQ-ACK codebook, all the DCI that participates in a generation process of the HAR-ACK codebook is sequentially traversed, to determine a bit that is of HARQ-ACK feedback information of a transport block scheduled by corresponding DCI and that is in the HARQ-ACK codebook.

For example, PDCCH monitoring occasions corresponding to the group of DCI are traversed in ascending order of index values of the PDCCH monitoring occasions, on a current PDCCH monitoring occasion, DCI on the PDCCH monitoring occasion in the group of DCI is traversed in ascending order of index values of component carriers on the traversed PDCCH monitoring occasions, each piece of DCI is traversed based on the traversed DCI and a traversal order, and a location of a feedback bit corresponding to a TB scheduled by each piece of DCI in the HARQ-ACK is obtained based on a value of a corresponding DAI indication. In this way, the HARQ-ACK codebook is generated, and each bit in the generated HARQ-ACK codebook sequentially corresponds to the DCI traversed based on the foregoing traversal order, that is, corresponds to the TB scheduled by the corresponding DCI.

The group of DCI that needs to be jointly fed back is a group of DCI that has a same HARQ-ACK feedback moment, for example, a group of DCI that needs to be fed back in a same slot or sub-slot.

The repeatedly transmitted DCI is DCI for scheduling a same TB. DAI indications carried in the repeatedly transmitted DCI are the same.

The index values of the PDCCH monitoring occasions are arranged in ascending order of time, and the index values of the component carriers are arranged in ascending order of frequency.

According to the foregoing HARQ-ACK codebook generation manner, in some embodiments of this application, the terminal device may generate the HARQ-ACK codebook according to a procedure shown in FIG. 10A and FIG. 10B.

As shown in FIG. 10A and FIG. 10B, the procedure may include the following steps.

S1001. UE determines, from a group of DCI that needs to be jointly fed back, repeatedly transmitted DCI, and determines that a first PDCCH monitoring occasion in monitoring occasions in which the repeatedly transmitted DCI is located and one piece of DCI in the repeatedly transmitted DCI participate in a HARQ-ACK codebook generation process, and other pieces of DCI in the repeatedly transmitted DCI do not participate in the HARQ-ACK codebook generation process.

In this step, the UE finds, from the received group of DCI that needs to be jointly fed back, DCI received on repeated PDCCH monitoring occasions (for ease of description, the DCI received on the repeated PDCCH monitoring occasions is referred to as repeatedly transmitted DCI in the following). DAI indications carried in the repeatedly transmitted DCI are the same.

If the repeatedly transmitted DCI received by the UE includes DCI on the first PDCCH monitoring occasion in the repeated PDCCH monitoring occasions, the DCI is reserved and other repeatedly transmitted DCI is discarded. If the repeatedly transmitted DCI received by the UE does not include DCI on the first PDCCH monitoring occasion in the repeated PDCCH monitoring occasions, the UE may determine, based on DCI received on other PDCCH monitoring occasions in the repeated PDCCH monitoring occasions, a DAI indication carried in the DCI on the first PDCCH monitoring occasion, and use the DAI indication to perform a subsequent HARQ-ACK codebook generation process (that is, use the DCI on the first PDCCH monitoring occasion to participate in the HARQ-ACK codebook generation process). However, DCI on other PDCCH occasions in the repeated PDCCH monitoring occasions does not participate in the HARQ-ACK codebook generation process. Alternatively, when the UE receives DCI on any one or more PDCCH monitoring occasions in the repeated PDCCH monitoring occasions, the UE participates in the HARQ-ACK codebook generation process based on a DAI value indicated by the any DCI and the first PDCCH monitoring occasion in the repeated PDCCH monitoring occasions, and other PDCCH monitoring occasions in the repeated PDCCH monitoring occasions do not participate in the HARQ-ACK codebook generation process.

S1002. The UE obtains, based on PDCCH monitoring occasions corresponding to the group of DCI, a PDCCH monitoring occasion with a minimum index value as a currently traversed PDCCH monitoring occasion.

S1003. The UE uses a component carrier with a smallest index value in component carriers for transmitting DCI on the currently traversed PDCCH monitoring occasion as a currently traversed component carrier.

S1004. The UE determines whether a counter DAI indication carried in DCI on the currently traversed component carrier is less than or equal to a counter DAI indication carried in previous traversed DCI, and if yes, increases a counter by 1, and proceeds to S1005; otherwise, directly proceeds to S1005.

If the DCI on the currently traversed component carrier is the first DCI in the group of DCI that needs to be jointly fed back, that is, there is no previous traversed DCI, the UE directly proceeds to S1005.

An initial value of the counter may be set to zero.

S1005. The UE determines, based on a current count value of the counter and the counter DAI indication carried in the DCI transmitted on the current component carrier on the currently traversed PDCCH monitoring occasion, a bit that is of HARQ-ACK feedback information corresponding to a TB scheduled by the DCI transmitted on the current component carrier on the current PDCCH monitoring occasion and that is in a HARQ-ACK codebook, and determines a value of the bit based on a receiving status of the TB.

If the TB is successfully decoded by the terminal device, a value of the bit is an ACK; or if the TB is not received or is not successfully decoded by the terminal device, a value of the bit is a NACK.

$$O^{ACK}O^{ACK}O^{ACK}4j + V^{DL}_{C\_DAI,c,m}$$

A location that is of the HARQ-ACK feedback information corresponding to the TB scheduled by the DCI transmitted on the current component carrier on the current PDCCH monitoring occasion and that is in the HARQ-ACK codebook may be represented as, that is, the current DCI corresponds to an $^{th}$ bit in the HARQ-ACK codebook, where:

$$O^{ACK}O^{ACK}O^{ACK}4j + V^{DL}_{C\_DAI,c,m} = -1$$

j is a count value of the counter;

$$V^{DL}_{C-DAI,c,m}$$

represents a counter DAI (C_DAI) indication carried in DCI transmitted on a PDCCH monitoring occasion m on a component carrier c; m represents an index value of a PDCCH monitoring occasion, c represents an index value of a component carrier, the PDCCH monitoring occasion m is a current PDCCH monitoring occasion, and the component carrier c is a current component carrier.

A value of the bit may be represented as $$\tilde{O}^{ACK}_{4j+V^{DL}_{C\_DAI,c,m}-1},$$

where a value 0 of $$\tilde{O}^{ACK}_{4j+V^{DL}_{C\_DAI,c,m}-1}$$

indicates that a TB corresponding to the bit is successfully decoded by the terminal device, and a value 1 of $$\tilde{O}^{ACK}_{4j+V^{DL}_{C\_DAI,c,m}-1}$$

indicates that the TB corresponding to the bit is not successfully decoded by the terminal device.

S1006. The UE determines whether the traversal of the DCI participating in the HARQ-ACK codebook generation process on the current PDCCH monitoring occasion is completed; if yes, proceeds to S1008; otherwise, proceeds to S1007.

S1007. The UE obtains, in ascending order of indexes of component carriers, a next component carrier for transmitting DCI on the current PDCCH monitoring occasion, uses the component carrier as a currently traversed component carrier, and returns to S1004.

S1008. The UE determines whether all PDCCH monitoring occasions in which the DCI that participates in the HARQ-ACK codebook generation process in the group of DCI is located are traversed; if yes, proceeds to S1010; otherwise, proceeds to S1009.

S1009. The UE obtains a next PDCCH monitoring occasion as a currently traversed PDCCH monitoring occasion in ascending order of index values, and returns to S1003.

S1010. Generate a HARQ-ACK codebook corresponding to the group of DCI that needs to be jointly fed back.

Figure 11:
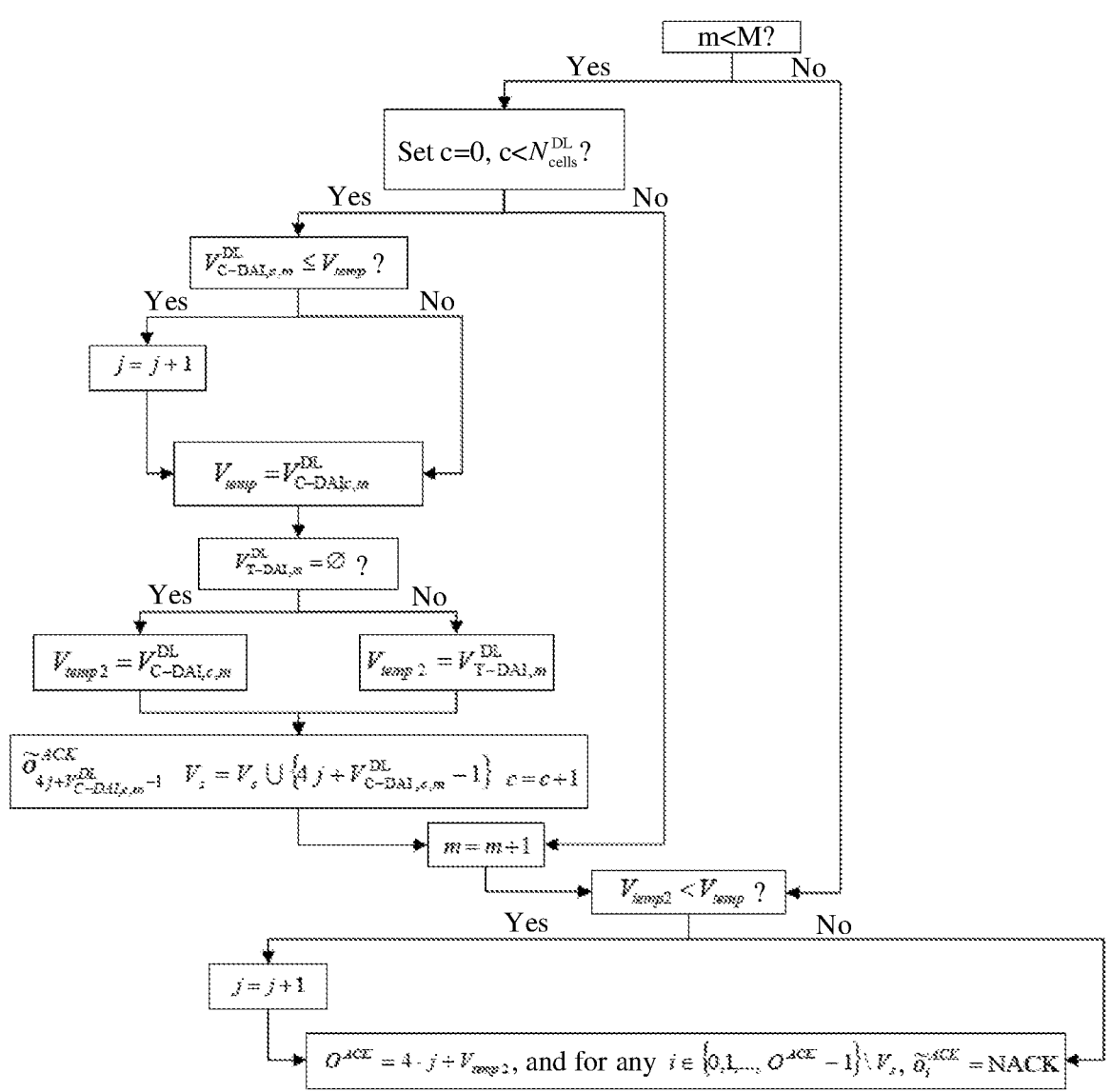
FIG. 11 is a schematic flowchart of pseudocode corresponding to a HARQ-ACK codebook generation process according to an embodiment of this application.

In some embodiments, the HACK-ACK codebook generation process shown in FIG. 10A and FIG. 10B may be implemented by using the following pseudocode, and a procedure represented by the following pseudocode may be shown in FIG. 11.

Specifically, after performing S1001, the UE may execute the following pseudocode:

It is set that m=0, where m indicates an index of a PDCCH monitoring occasion, and the index of each PDCCH monitoring occasion is sorted in ascending order based on a start moment of a search space set associated with each monitoring occasion.

It is set that j=0, $V_{temp}$=0, $V_{temp2}$=0, and $V_s$=φ, where j, $V_{temp}$, $V_{temp2}$, and $V_s$ are intermediate variables, $V_{temp}$ is for recording a counter DAI indication carried in the traversed DCI, $V_{temp2}$ is for recording a total DAI indication carried in the traversed DCI, $V_s$ is for recording a quantity of current HARQ-ACK feedback bits, and $V_s$=φ represents that an initial value of $V_s$ is set to empty.

It is set that $$N^{DL}_{cells}$$

is equal to a quantity of configured component carriers for transmitting the DCI.

$$c < N^{DL}_{cells}\ V^{DL}_{C\_DAI,c,m} \leq V_{temp}\ V_{temp} = V^{DL}_{C\_DAI,c,m}\ V^{DL}_{C\_DAI,c,m}\ V^{DL}_{T\_DAI,m} =$$

-continued $$\phi V_{temp2} = V^{DL}_{C\_DAI,c,m} V^{DL}_{T\_DAI,m} V_{temp2} = V^{DL}_{T\_DAI,m} 4j +$$

$$V^{DL}_{C\_DAI,c,m} \tilde{O}^{ACK}_{4j+V^{DL}_{C\_DAI,c,m}-1} V_s = V_s \cup \{4j + V^{DL}_{C\_DAI,c,m} - 1\} V_{temp2} < V_{temp}$$

It is set that M is equal to a total quantity of PDCCH monitoring occasions corresponding to a group of DCI that needs to be jointly fed back.

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} = \phi V_{temp2} =$$

$$V^{DL}_{C\_DAI,c,m} V^{DL}_{T\_DAI,m} V_{temp2} = V^{DL}_{T\_DAI,m} 4j + V^{DL}_{C\_DAI,c,m} \tilde{O}^{ACK}_{4j+V^{DL}_{C\_DAI,c,m}-1} V_s =$$

$$V_s \cup \{4j + V^{DL}_{C\_DAI,c,m} - 1\} V_{temp2} < V_{temp} \text{ when } m < M$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} =$$

$$\phi V_{temp2} = V^{DL}_{C\_DAI,c,m} V^{DL}_{T\_DAI,m} V_{temp2} = V^{DL}_{T\_DAI,m} 4j +$$

$$V^{DL}_{C\_DAI,c,m} \tilde{O}^{ACK}_{4j+V^{DL}_{C\_DAI,c,m}-1} V_s = V_s \cup \{4j + V^{DL}_{C\_DAI,c,m} - 1\} V_{temp2} < V_{temp}$$

c is set to 0;

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} =$$

$$\phi V_{temp2} = V^{DL}_{C\_DAI,c,m} V^{DL}_{T\_DAI,m} V_{temp2} = V^{DL}_{T\_DAI,m} 4j +$$

$$V^{DL}_{C\_DAI,c,m} \tilde{O}^{ACK}_{4j+V^{DL}_{C\_DAI,c,m}-1} V_s = V_s \cup \{4j + V^{DL}_{C\_DAI,c,m} - 1\} V_{temp2} < V_{temp}$$

when if j=j+1;

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} = \phi V_{temp2} =$$

$$V^{DL}_{C\_DAI,c,m} V^{DL}_{T\_DAI,m} V_{temp2} = V^{DL}_{T\_DAI,m} 4j + V^{DL}_{C\_DAI,c,m} \tilde{O}^{ACK}_{4j+V^{DL}_{C\_DAI,c,m}-1} V_s =$$

$$V_s \cup \{4j + V^{DL}_{C\_DAI,c,m} - 1\} V_{temp2} < V_{temp} \text{ End}$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} =$$

$$\phi V_{temp2} = V^{DL}_{C\_DAI,c,m} V^{DL}_{T\_DAI,m} V_{temp2} = V^{DL}_{T\_DAI,m} 4j +$$

$$V^{DL}_{C\_DAI,c,m} \tilde{O}^{ACK}_{4j+V^{DL}_{C\_DAI,c,m}-1} V_s = V_s \cup \{4j + V^{DL}_{C\_DAI,c,m} - 1\} V_{temp2} < V_{temp}$$

where is a counter DAI (counter DAI);

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} =$$

$$\phi V_{temp2} = V^{DL}_{C\_DAI,c,m} V^{DL}_{T\_DAI,m} V_{temp2} = V^{DL}_{T\_DAI,m} 4j +$$

$$V^{DL}_{C\_DAI,c,m} \tilde{O}^{ACK}_{4j+V^{DL}_{C\_DAI,c,m}-1} V_s = V_s \cup \{4j + V^{DL}_{C\_DAI,c,m} - 1\} V_{temp2} < V_{temp}$$

if, where is a total DAI (total DAI);

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} = \phi V_{temp2} =$$

$$V^{DL}_{C\_DAI,c,m} V^{DL}_{T\_DAI,m} V_{temp2} = V^{DL}_{T\_DAI,m} 4j + V^{DL}_{C\_DAI,c,m} \tilde{O}^{ACK}_{4j+V^{DL}_{C\_DAI,c,m}-1} V_s =$$

$$V_s \cup \{4j + V^{DL}_{C\_DAI,c,m} - 1\} V_{temp2} < V_{temp} \text{ otherwise,}$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} =$$

$$\phi V_{temp2} = V^{DL}_{C\_DAI,c,m} V^{DL}_{T\_DAI,m} V_{temp2} = V^{DL}_{T\_DAI,m} 4j +$$

-continued $$V^{DL}_{C\_DAI,c,m} \tilde{O}^{ACK}_{4j+V^{DL}_{C\_DAI,c,m}-1} V_s = V_s \cup \{4j + V^{DL}_{C\_DAI,c,m} - 1\} V_{temp2} < V_{temp};$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} = \phi V_{temp2} =$$

$$V^{DL}_{C\_DAI,c,m} V^{DL}_{T\_DAI,m} V_{temp2} = V^{DL}_{T\_DAI,m} 4j + V^{DL}_{C\_DAI,c,m} \tilde{O}^{ACK}_{4j+V^{DL}_{C\_DAI,c,m}-1} V_s =$$

$$V_s \cup \{4j + V^{DL}_{C\_DAI,c,m} - 1\} V_{temp2} < V_{temp} \text{ End}$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} =$$

$$\phi V_{temp2} = V^{DL}_{C\_DAI,c,m} V^{DL}_{T\_DAI,m} V_{temp2} = V^{DL}_{T\_DAI,m} 4j +$$

$$V^{DL}_{C\_DAI,c,m} \tilde{O}^{ACK}_{4j+V^{DL}_{C\_DAI,c,m}-1} V_s = V_s \cup \{4j + V^{DL}_{C\_DAI,c,m} - 1\} V_{temp2} < V_{temp}$$

A HARQ-ACK feedback value of a $(-1)^{th}$ bit is set based on a receiving status of a TB scheduled by current DCI, where the HARQ-ACK feedback value of the bit is represented as;

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} =$$

$$\phi V_{temp2} = V^{DL}_{C\_DAI,c,m} V^{DL}_{T\_DAI,m} V_{temp2} = V^{DL}_{T\_DAI,m} 4j +$$

$$V^{DL}_{C\_DAI,c,m} \tilde{O}^{ACK}_{4j+V^{DL}_{C\_DAI,c,m}-1} V_s = V_s \cup \{4j + V^{DL}_{C\_DAI,c,m} - 1\} V_{temp2} < V_{temp}$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} = \phi V_{temp2} =$$

$$V^{DL}_{C\_DAI,c,m} V^{DL}_{T\_DAI,m} V_{temp2} = V^{DL}_{T\_DAI,m} 4j + V^{DL}_{C\_DAI,c,m} \tilde{O}^{ACK}_{4j+V^{DL}_{C\_DAI,c,m}-1} V_s =$$

$$V_s \cup \{4j + V^{DL}_{C\_DAI,c,m} - 1\} V_{temp2} < V_{temp} \; c = c + 1;$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} = \phi V_{temp2} =$$

$$V^{DL}_{C\_DAI,c,m} V^{DL}_{T\_DAI,m} V_{temp2} = V^{DL}_{T\_DAI,m} 4j + V^{DL}_{C\_DAI,c,m} \tilde{O}^{ACK}_{4j+V^{DL}_{C\_DAI,c,m}-1} V_s =$$

$$V_s \cup \{4j + V^{DL}_{C\_DAI,c,m} - 1\} V_{temp2} < V_{temp} \; m = m + 1$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} = \phi V_{temp2} =$$

$$V^{DL}_{C\_DAI,c,m} V^{DL}_{T\_DAI,m} V_{temp2} = V^{DL}_{T\_DAI,m} 4j + V^{DL}_{C\_DAI,c,m} \tilde{O}^{ACK}_{4j+V^{DL}_{C\_DAI,c,m}-1} V_s =$$

$$V_s \cup \{4j + V^{DL}_{C\_DAI,c,m} - 1\} V_{temp2} < V_{temp} \text{ if } j = j + 1$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} = \phi V_{temp2} =$$

$$V^{DL}_{C\_DAI,c,m} V^{DL}_{T\_DAI,m} V_{temp2} = V^{DL}_{T\_DAI,m} 4j + V^{DL}_{C\_DAI,c,m} \tilde{O}^{ACK}_{4j+V^{DL}_{C\_DAI,c,m}-1} V_s =$$

$$V_s \cup \{4j + V^{DL}_{C\_DAI,c,m} - 1\} V_{temp2} < V_{temp} \text{ End}$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} =$$

$$\phi V_{temp2} = V^{DL}_{C\_DAI,c,m} V^{DL}_{T\_DAI,m} V_{temp2} = V^{DL}_{T\_DAI,m} 4j +$$

$$V^{DL}_{C\_DAI,c,m} \tilde{O}^{ACK}_{4j+V^{DL}_{C\_DAI,c,m}-1} V_s = V_s \cup \{4j + V^{DL}_{C\_DAI,c,m} - 1\} V_{temp2} < V_{temp}$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} =$$

$$\phi V_{temp2} = V^{DL}_{C\_DAI,c,m} V^{DL}_{T\_DAI,m} V_{temp2} = V^{DL}_{T\_DAI,m} 4j +$$

$$V^{DL}_{C\_DAI,c,m} \tilde{O}^{ACK}_{4j+V^{DL}_{C\_DAI,c,m}-1} V_s = V_s \cup \{4j + V^{DL}_{C\_DAI,c,m} - 1\} V_{temp2} < V_{temp}$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} =$$

$$\phi V_{temp2} = V^{DL}_{C\_DAI,c,m} V^{DL}_{T\_DAI,m} V_{temp2} = V^{DL}_{T\_DAI,m} 4j +$$

$$V^{DL}_{C\_DAI,c,m} \tilde{O}^{ACK}_{4j+V^{DL}_{C\_DAI,c,m}-1} V_s = V_s \cup \{4j + V^{DL}_{C\_DAI,c,m} - 1\} V_{temp2} < V_{temp}$$

$$c < N^{DL}_{cells} V^{DL}_{C\_DAI,c,m} \leq V_{temp} \; V_{temp} = V^{DL}_{C\_DAI,c,m} V^{DL}_{C\_DAI,c,m} V^{DL}_{T\_DAI,m} =$$

$$\phi V_{temp2} = V^{DL}_{C\_DAI,c,m} V^{DL}_{T\_DAI,m} V_{temp2} = V^{DL}_{T\_DAI,m} 4j +$$

$$V^{DL}_{C\_DAI,c,m} \tilde{O}^{ACK}_{4j+V^{DL}_{C\_DAI,c,m}-1} V_s = V_s \cup \{4j + V^{DL}_{C\_DAI,c,m} - 1\} V_{temp2} < V_{temp}$$

$O^{ACK}O^{ACK}$=4j+$V_{temp2}$ After the pseudocode is executed, the HARQ-ACK codebook may be obtained. A quantity of bits in the HARQ-ACK codebook is:

$$O^{ACK}O^{ACK}=4j+V_{temp2}$$

For any $$i \in \{0, 1, \dots , O^{ACK} - 1\}\backslash V_s, \delta_i^{ACK} = NACK.$$

Vs represents a HARQ-ACK corresponding to the received DCI, and all HARQ-ACK bits (i does not belong to \Vs) that do not receive the DCI are a NACK.

According to the HARQ-ACK codebook generation process described in FIG. 10A and FIG. 10B, FIG. 11, or the pseudocode, the DCI transmission scenario shown in (a) in FIG. 8 and determination of the DAI indication carried in the repeatedly transmitted DCI by using the first PDCCH monitoring occasion as a reference monitoring occasion are used as an example:

The UE receives DCI 1 and DCI 2 on a component carrier 1 (CC 1) and a component carrier 2 (CC 2) on a PDCCH monitoring occasion 1, and receives DCI 3 and DCI 4 on a component carrier 1 (CC 1) and a component carrier 2 (CC 2) on a PDCCH monitoring occasion 2. The UE determines that HARQ-ACK feedback information corresponding to the four pieces of DCI needs to be fed back at a same feedback moment, and therefore determines that the four pieces of DCI are a group of DCI that needs to be jointly fed back. The UE determines that the DCI 2 and the DCI 4 in the group of DCI schedule a same TB. That is, the DCI 2 and the DCI 4 are repeatedly transmitted DCI. Therefore, in the DCI 2 and the DCI 4, the DCI 2 received on the PDCCH monitoring occasion 1 is reserved, and the DCI 4 received on the PDCCH monitoring occasion 2 is discarded; or the HARQ-ACK codebook is determined only based on the DCI 2.

Figures 12A, 12B:
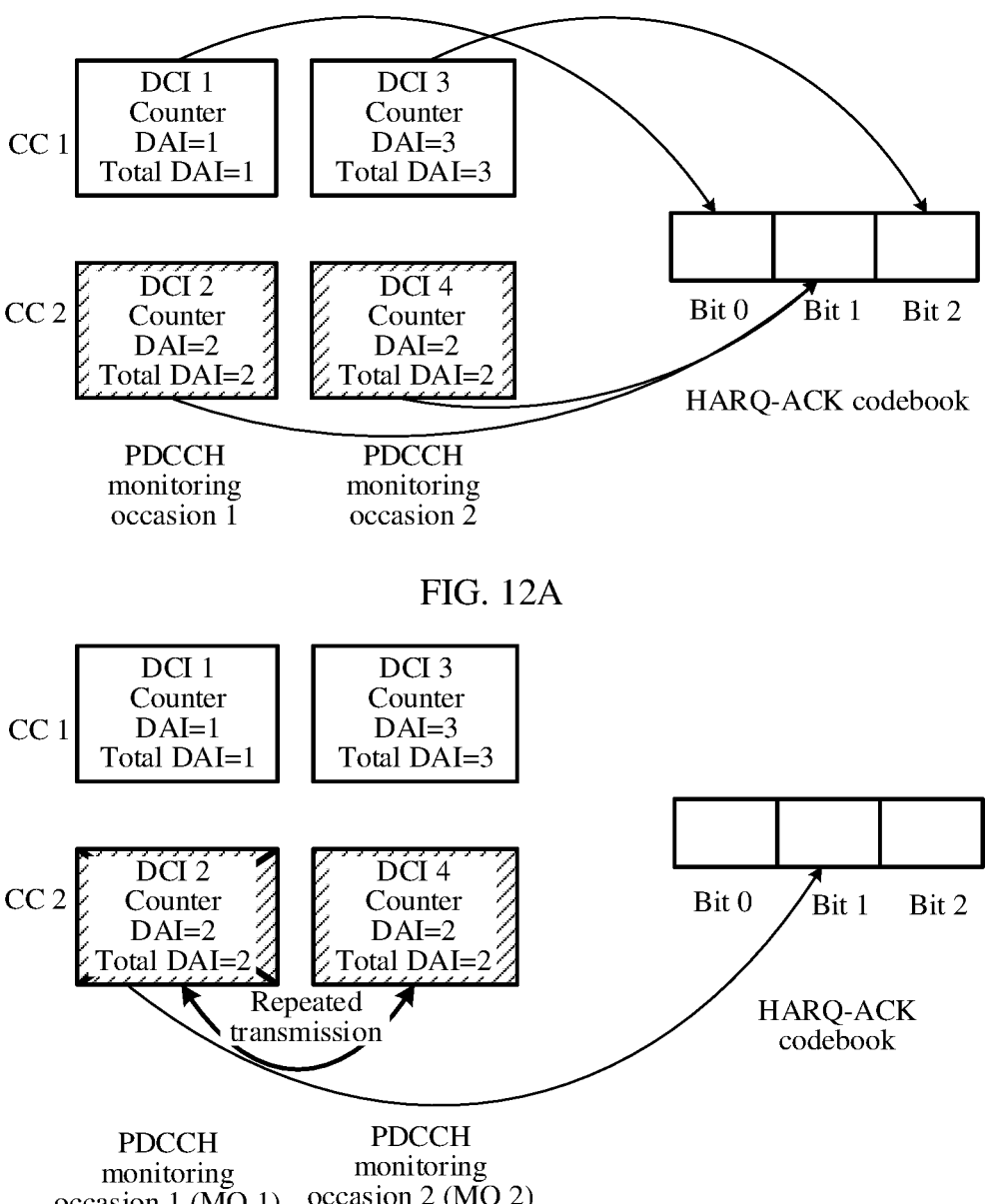
FIG. 12A and FIG. 12B are schematic diagrams of generated HARQ-ACK codebooks according to an embodiment of this application.

The UE traverses each piece of DCI in the group of DCI in a traversal order of the DCI, to determine a bit that is of feedback information corresponding to a TB scheduled by each piece of DCI and that is in the HARQ-ACK codebook, and obtains the HARQ-ACK codebook shown in FIG. 12A based on a receiving status of the TB.

It should be noted that, if the UE does not receive the DCI 2 on the PDCCH monitoring occasion 1, that is, misses detecting the DCI 2, because the DCI 2 and the DCI 4 are repeatedly transmitted DCI, an order of the DCI 2 on the PDCCH monitoring occasion 1 may be determined based on a DAI indication carried in the DCI 4 received on the PDCCH monitoring occasion 2, and then the HARQ-ACK codebook shown in FIG. 12A is determined. For example, according to the HARQ-ACK codebook generation process described in FIG. 10A and FIG. 10B, FIG. 11, or the pseudocode, the DCI transmission scenario shown in FIG. 12B is used as an example, and determination of the DAI indication carried in the repeatedly transmitted DCI by using the first PDCCH monitoring occasion as a reference monitoring occasion is used as an example:

The UE receives DCI 1 on a component carrier 1 (CC 1) on a PDCCH monitoring occasion 1, and receives DCI 3 and the DCI 4 on a component carrier 1 (CC 1) and a component carrier 2 (CC 2) on a PDCCH monitoring occasion 2 respectively. The UE determines that HARQ-ACK feedback information corresponding to the three pieces of DCI needs to be fed back at a same feedback moment, and therefore determines that the three pieces of DCI are a group of DCI that needs to be jointly fed back. The UE determines that the DCI 4 in the group of DCI is located on a PDCCH monitoring occasion for repeated transmission. Therefore, when the HARQ-ACK codebook is determined, a PDCCH monitoring occasion corresponding to the DCI 4 is the MO 1.

According to the HARQ-ACK codebook generation process described in FIG. 10A and FIG. 10B, FIG. 11, or the pseudocode, the DCI transmission scenario shown in (a) in FIG. 9 and determination of the DAI indication carried in the repeatedly transmitted DCI by using the first PDCCH monitoring occasion as a reference monitoring occasion are used as an example:

The UE receives DCI 1 and DCI 2 on a component carrier 1 (CC 1) and a component carrier 2 (CC 2) on a PDCCH monitoring occasion 1, receives DCI 3 and DCI 4 on a component carrier 1 (CC 1) and a component carrier 2 (CC 2) on a PDCCH monitoring occasion 2, and receives DCI 5 and DCI 6 on a component carrier 1 (CC 1) and a component carrier 2 (CC 2) on a PDCCH monitoring occasion 3. The UE determines that HARQ-ACK feedback information corresponding to the six pieces of DCI needs to be fed back at a same feedback moment, and therefore determines the six pieces of DCI as a group of DCI that needs to be jointly fed back. The UE determines that the DCI 2 and the DCI 6 in the group of DCI are repeatedly transmitted DCI, and the DCI 3 and the DCI 5 are repeatedly transmitted DCI. Therefore, in the DCI 2 and the DCI 6, the DCI 2 received on the PDCCH monitoring occasion 1 is reserved, and the DCI 6 received on the PDCCH monitoring occasion 3 is discarded; and in the DCI 3 and the DCI 5, the DCI 3 received on the PDCCH monitoring occasion 2 is reserved, and the DCI 5 received on the PDCCH monitoring occasion 3 is discarded.

Figure 13A:
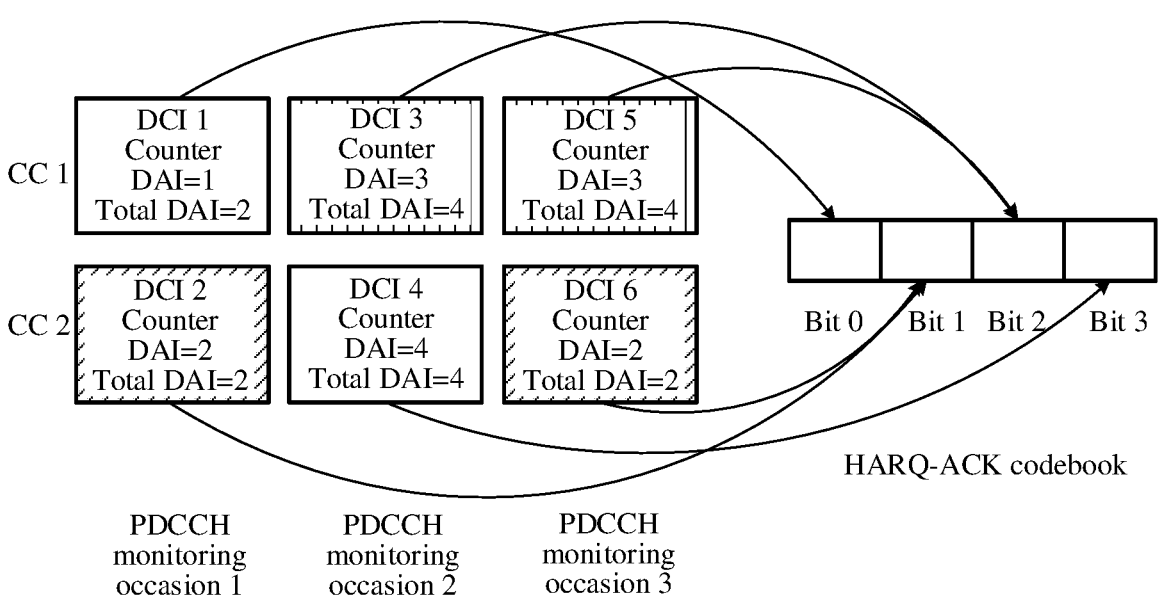
FIG. 13A and FIG. 13B are schematic diagrams of generated HARQ-ACK codebooks according to an embodiment of this application.

The UE traverses each piece of DCI in the group of DCI in a traversal order of the DCI, to determine a bit that is of feedback information corresponding to a TB scheduled by each piece of DCI and that is in the HARQ-ACK codebook, and obtains the HARQ-ACK codebook shown in FIG. 13A based on a receiving status of the TB.

Figure 13B:
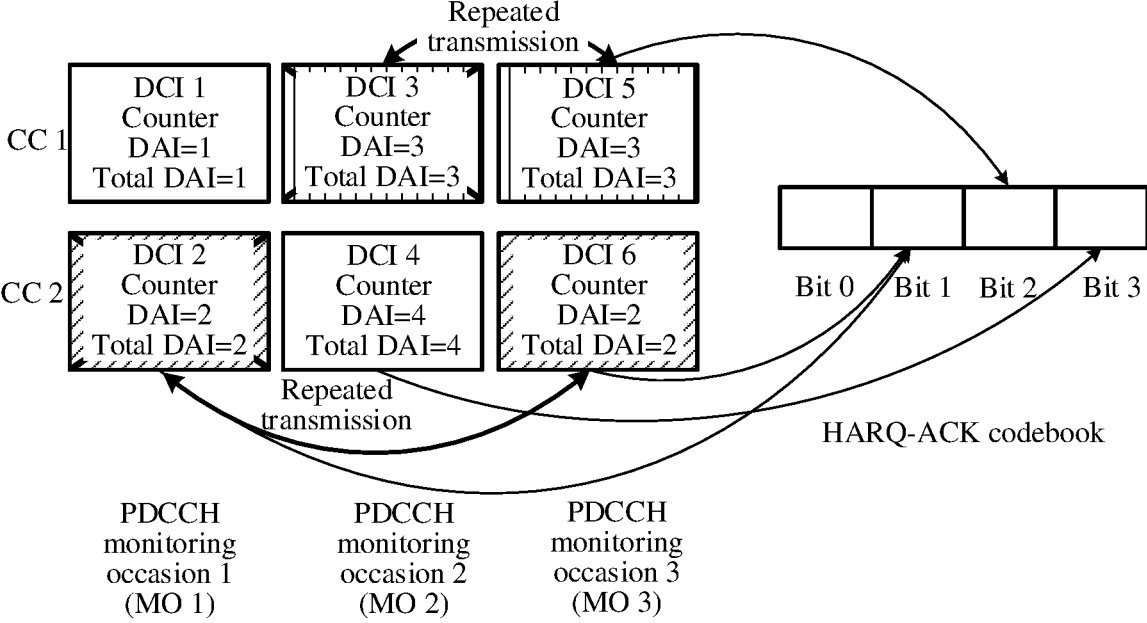

It should be noted that, if the UE does not receive the DCI 2 on the PDCCH monitoring occasion 1, that is, the UE misses detecting the DCI 2, because the DCI 2 and the DCI 6 are repeatedly transmitted DCI, an order of the DCI 2 on the PDCCH monitoring occasion 1 may be determined based on the DCI 6 received on the PDCCH monitoring occasion 3. If the UE does not receive the DCI 3 on the PDCCH monitoring occasion 2, that is, the UE misses detecting the DCI 3, because the DCI 3 and the DCI 5 are repeatedly transmitted DCI, therefore, an order of the DCI 3 on the PDCCH monitoring occasion 2 may be determined based on the DCI 5 received on the PDCCH monitoring occasion 3, so as to determine the HARQ-ACK codebook shown in FIG. 13A. For example, according to the HARQ-ACK codebook generation process described in FIG. 10A and FIG. 10B, FIG. 11, or the pseudocode, the DCI transmission scenario shown in FIG. 13B is used as an example, and determination of the DAI indication carried in the repeatedly transmitted DCI by using the first PDCCH monitoring occasion as a reference monitoring occasion is used as an example:

The UE receives DCI 1 on a component carrier 1 (CC 1) on a PDCCH monitoring occasion 1, receives DCI 4 on a component carrier 2 (CC 2) on a PDCCH monitoring occasion 2, and receives DCI 5 and DCI 6 on a CC 1 and a CC 2 on a PDCCH monitoring occasion 3 respectively. The UE determines that HARQ-ACK feedback information corresponding to the four pieces of DCI needs to be fed back at a same feedback moment, and therefore determines that the four pieces of DCI are a group of DCI that needs to be jointly fed back. The UE determines that the DCI 6 in the group of DCI is located on a PDCCH monitoring occasion for repeated transmission. Therefore, when the HARQ-ACK codebook is determined, a PDCCH monitoring occasion corresponding to the DCI 6 is the MO 1. In addition, the UE determines that the DCI 5 in the group of DCI is located on a PDCCH monitoring occasion for repeated transmission. Therefore, when the HARQ-ACK codebook is determined, a PDCCH monitoring occasion corresponding to the DCI 5 is the MO 2.

In this embodiment of this application, the first PDCCH monitoring occasion and the second PDCCH monitoring occasion are indicated by the network device to the terminal device by using the monitoring occasion configuration information. Specifically, the network device may send the monitoring occasion configuration information to the terminal device, where the monitoring occasion configuration information indicates that the first PDCCH monitoring occasion and the second PDCCH monitoring occasion are repeated PDCCH monitoring occasions, and DCI sent on the repeated PDCCH monitoring occasions is for scheduling a same TB. The terminal device may detect, based on the received monitoring occasion configuration information, the first DCI and the second DCI on the first PDCCH monitoring occasion and the second PDCCH monitoring occasion that are indicated by the monitoring occasion configuration information.

In some embodiments, the first PDCCH monitoring occasion and the second PDCCH monitoring occasion correspond to different PDCCH monitoring occasions in a same search space set. The monitoring occasion configuration information is configured in the search space set. In other words, an identifier is configured in the search space set, and the identifier indicates that the search space set corresponds to a repeated DCI transmission mechanism. Specifically, the network device configures a search space set for the terminal device. The search space set includes a first PDCCH monitoring occasion and a second PDCCH monitoring occasion, and the first PDCCH monitoring occasion and the second PDCCH monitoring occasion are repeated PDCCH monitoring occasions. The network device sends configuration information of the search space set to the terminal device, so that the terminal device detects, on the first PDCCH monitoring occasion, first DCI sent by the network device on the monitoring occasion, detects, on the second PDCCH monitoring occasion, second DCI sent by the network device on the monitoring occasion, and may directly determine that the first DCI and the second DCI schedule a same TB.

Specifically, when the network device configures the search space set for the terminal device, for a search space set, a periodicity or an offset of a PDCCH monitoring occasion may be configured. The periodicity or the offset of the PDCCH monitoring occasion indicates a location of the PDCCH monitoring occasion. That is, a start location and an end location of the PDCCH monitoring occasion may be determined based on the periodicity or the offset of the PDCCH monitoring occasion. Based on this, in this embodiment of this application, a location relationship and a quantity of a plurality of associated PDCCH monitoring occasions may be further defined, to indicate that there is an association relationship between the plurality of PDCCH monitoring occasions, and the plurality of PDCCH monitoring occasions that have the association relationship are repeated PDCCH monitoring occasions. For example, in the monitoring occasions configured for the search space set, an odd monitoring occasion is a first PDCCH monitoring occasion, an even monitoring occasion is a second PDCCH monitoring occasion, and two monitoring occasions with adjacent serial numbers are for carrying repeatedly transmitted DCI.

For example, a periodicity of a PDCCH monitoring occasion configured in a search space set is 1 ms, and an adjacent PDCCH monitoring occasion may be further defined as a monitoring occasion having an association relationship (that is, the adjacent PDCCH monitoring occasion is a repeated PDCCH monitoring occasion). Specifically, for the search space set, a PDCCH monitoring occasion at an $n^{th}$ ms and a PDCCH monitoring occasion at an $(n+1)^{th}$ ms are repeated PDCCH monitoring occasions, a PDCCH monitoring occasion at an $(n+2)^{th}$ ms and a PDCCH monitoring occasion at an $(n+3)^{th}$ ms are repeated PDCCH monitoring occasions, and so on. Therefore, the monitoring occasions at the $n^{th}$, the $(n+2)^{th}$, and . . . ms are the first PDCCH monitoring occasion, and the monitoring occasions at the $(n+1)^{th}$, the $(n+3)^{th}$, and . . . ms are the second PDCCH monitoring occasion.

In some other embodiments, the first DCI and the second DCI correspond to PDCCH monitoring occasions in different search space sets. Specifically, the network device configures a first search space set and a second search space set for the terminal device, where the first search space set is for configuring the first PDCCH monitoring occasion, and the second search space set is for configuring the second PDCCH monitoring occasion. In other words, the first PDCCH monitoring occasion and the second PDCCH monitoring occasion are identified by using different search space sets. The first PDCCH monitoring occasion and the second PDCCH monitoring occasion are repeated PDCCH monitoring occasions. For example, an association relationship may be configured between the first search space set and the second search space set. In this case, DCI separately delivered by the first search space set and the second search space set is repeatedly transmitted DCI. The network device sends configuration information of the first search space set and configuration information of the second search space set to the terminal device, so that the terminal device detects, on the first PDCCH monitoring occasion in the first search space, first DCI sent by the network device on the monitoring occasion, and detects, on the second PDCCH monitoring occasion in the second search space set, second DCI sent by the network device on the monitoring occasion, where the first DCI and the second DCI schedule a same TB.

For example, an association relationship is configured between the first search space set (SSS) and the second SSS, a first PDCCH monitoring occasion is configured in the first SSS, and a second PDCCH monitoring occasion is configured in the second SSS. One or more time windows may be defined. In this case, the first PDCCH monitoring occasion in the first SSS and the second PDCCH monitoring occasion in the second SSS in the time window are repeated PDCCH monitoring occasions. A size of the time window needs to ensure that the time window at least includes one PDCCH monitoring occasion configured for the first search space set and one PDCCH monitoring occasion configured for the second search space set. For example, if periodicities of the first PDCCH monitoring occasion in the first SSS and the second PDCCH monitoring occasion in the second SSS are both 1 ms, the time window may be set to 2 ms. The time window includes the PDCCH monitoring occasion in the first SSS and the PDCCH monitoring occasion in the second SSS, and the two PDCCH monitoring occasions are repeated PDCCH monitoring occasions.

It should be noted that a plurality of search space sets may be configured for one terminal device. Repeated PDCCH monitoring occasions may be configured for only some search space sets, and no repeated PDCCH monitoring occasion is configured for remaining search space sets. For example, two search space sets are configured for one terminal device, and only two PDCCH monitoring occasions in one search space set are configured as repeated PDCCH monitoring occasions. For another example, three search space sets are configured for one terminal device, and PDCCH monitoring occasions in two search space sets are configured as repeated PDCCH monitoring occasions. For another example, if PDCCH candidates at some aggregation levels configured in a search space are for repeated transmission, monitoring occasions corresponding to the aggregation levels are repeated PDCCH monitoring occasions.

Optionally, an index value of the first PDCCH monitoring occasion may be less than an index value of the second PDCCH monitoring occasion.

In some embodiments of this application, a multiple chance (multiple chance) DCI transmission mechanism may be used. In the multiple chance DCI transmission mechanism, the terminal device independently detects/demodulates/decodes DCI on a PDCCH monitoring occasion configured by the network device. In other words, the terminal device does not perceive repeated DCI sending.

In some embodiments, in the multiple chance DCI transmission mechanism, the terminal device may determine, in the following manner, an uplink resource (for example, a PUCCH resource) for carrying the HARQ-ACK codebook:

The terminal device receives the first DCI on the first PDCCH monitoring occasion, and after receiving the second DCI on the second PDCCH monitoring occasion, determines a group of DCI, where HARQ-ACK feedback information corresponding to the group of DCI is fed back on a same PUCCH resource, and the group of DCI includes the first DCI and the second DCI. The terminal device sorts the group of DCI, and determines target DCI from the group of DCI based on an order of each of the group of DCI, where the target DCI indicates the PUCCH resource. The terminal device may determine, based on the target DCI, the PUCCH resource for feeding back the HARQ-ACK codebook.

An order of the first DCI in the group of DCI is determined based on the first monitoring occasion, and an order of the second DCI in the group of DCI is determined based on the second PDCCH monitoring occasion.

Optionally, the target DCI may be last sorted DCI after the group of DCI is sorted.

In some other embodiments, in the multiple chance DCI transmission mechanism, the terminal device may determine, in the following manner, an uplink resource (for example, a PUCCH resource) for carrying the HARQ-ACK codebook:

The terminal device receives the first DCI on the first PDCCH monitoring occasion, and after receiving the second DCI on the second PDCCH monitoring occasion, determines a group of DCI, where HARQ-ACK feedback information corresponding to the group of DCI is fed back on a same PUCCH resource, and the group of DCI includes the second DCI. The terminal device sorts the group of DCI, and determines target DCI from the group of DCI based on an order of each of the group of DCI, where the target DCI indicates the PUCCH resource. The terminal device may determine, based on the target DCI, the PUCCH resource for feeding back the HARQ-ACK codebook.

An order of the second DCI in the group of DCI is determined based on the second PDCCH monitoring occasion.

Optionally, the target DCI may be last sorted DCI after the group of DCI is sorted.

In some other embodiments of this application, a repeated DCI transmission mechanism may be used. In the repeated transmission mechanism, the terminal device independently detects/demodulates DCI but performs joint decoding on a PDCCH monitoring occasion configured by the network device. For example, the terminal device obtains a plurality of pieces of demodulated soft information through a plurality of PDCCH monitoring occasions, and combines the plurality of pieces of soft information for decoding, thereby equivalently improving an SNR of DCI receiving, and improving DCI receiving reliability. The terminal device needs to perceive repeated DCI transmission. Specifically, an association relationship between PDCCH candidates (a PDCCH detection unit, one PDCCH candidate corresponds to one DCI detection process, and corresponds to a specific time-frequency resource for carrying DCI) on different PDCCH monitoring occasions may be agreed in advance. The terminal device may determine a sending location of the repeated DCI based on the association relationship, to detect and demodulate the DCI, and perform soft combining and decoding operations on the associated PDCCH candidates respectively.

In the repeated DCI transmission mechanism, the network device and the terminal device may determine, in the following manner, an uplink resource for carrying the HARQ-ACK codebook:

The network device sends configuration information.

The network device sends a group of DCI, including first DCI and/or second DCI.

The terminal device receives the configuration information, where the configuration information indicates that the first PDCCH candidate and the second PDCCH candidate have an association relationship, and the association relationship indicates that DCI of the first PDCCH candidate and DCI of the second PDCCH candidate are repeatedly transmitted. The first DCI corresponds to the first PDCCH candidate and is located on a first PDCCH monitoring occasion, and the second DCI corresponds to the second PDCCH candidate and is located on a second PDCCH monitoring occasion. The terminal device determines a group of DCI, where the group of DCI includes the first DCI and/or the second DCI, and HARQ-ACK feedback information corresponding to the DCI is fed back on a same PUCCH resource. The terminal device sorts the group of DCI, and determines target DCI from the group of DCI based on an order of each of the group of DCI, where the target DCI indicates the PUCCH resource. The terminal device may determine, based on the target DCI, the PUCCH resource for feeding back the HARQ-ACK codebook.

An order of the first DCI in the group of DCI is determined based on the first monitoring occasion, or an order of the second DCI in the group of DCI is determined based on the first monitoring occasion, or an order of the first DCI in the group of DCI and an order of the second DCI in the group of DCI are both determined based on the first PDCCH monitoring occasion. The first PDCCH monitoring occasion is earlier than the second PDCCH monitoring occasion, or in other words, an index value of the first PDCCH monitoring occasion is less than an index value of the second PDCCH monitoring occasion. In this manner, the terminal device determines orders of all DCI on repeated transmission occasions based on an earliest transmission occasion in the repeated transmission occasions, so that a base station side can be prevented from performing a pre-scheduling operation to determine a PUCCH resource in advance, thereby increasing implementation flexibility of the base station.

That the first DCI corresponds to the first PDCCH candidate may be understood as: the first DCI is transmitted on a resource corresponding to the first PDCCH candidate. That the second DCI corresponds to the second PDCCH candidate may be understood as: the second DCI is transmitted on a resource corresponding to the second PDCCH candidate.

It should be understood that, if DCI is detected on either of the first PDCCH monitoring occasion and the second PDCCH monitoring occasion in a component carrier/BWP, the DCI detected on the foregoing PDCCH monitoring occasion is sorted only based on the first PDCCH monitoring occasion.

FIG. 14 is a schematic flowchart of an example of HARQ-ACK feedback implemented on a network device side according to an embodiment of this application.

S1401. A network device sends first DCI on a first PDCCH monitoring occasion, and sends second DCI on a second PDCCH monitoring occasion.

The first DCI and the second DCI are for scheduling a same TB.

A DAI indication carried in the first DCI is the same as that carried in the second DCI. Optionally, the first DCI and the second DCI carry a same counter DAI indication, and carry a same total DAI indication.

Optionally, the first DCI and the second DCI are located on a same component carrier or in a same BWP.

Optionally, the DAI indications carried in the first DCI and the second DCI are determined based on an index value of the first PDCCH monitoring occasion.

Optionally, the index value of the first PDCCH monitoring occasion is less than an index value of the second PDCCH monitoring occasion.

For related descriptions of the first PDCCH, the second PDCCH, the first DCI, and the second DCI, refer to the foregoing embodiments.

S1402. The network device receives a HARQ-ACK codebook sent by a terminal device.

The terminal device may generate the HARQ-ACK codebook in the manner in the foregoing embodiments.

S1403. The network device determines, based on the first PDCCH monitoring occasion and a DAI indication carried in at least one of the first DCI and the second DCI, HARQ-ACK feedback information corresponding to a TB in the HARQ-ACK codebook.

The first DCI and the second DCI correspond to a same bit in the HARQ-ACK codebook.

In this step, the network device may determine, based on the first PDCCH monitoring occasion and the DAI indication carried in at least one of the first DCI and the second DCI, a bit that is of a HARQ-ACK bit corresponding to a same TB scheduled by the first DCI and/or the second DCI and that is in the HARQ-ACK codebook. A specific implementation is the same as a manner in which the terminal device determines a bit that is of the HARQ-ACK bit corresponding to the TB and that is in the HARQ-ACK codebook described in the foregoing embodiments.

In some embodiments, the network device may further send monitoring occasion configuration information, where the monitoring occasion configuration information indicates that the first PDCCH monitoring occasion and the second PDCCH monitoring occasion are repeated PDCCH monitoring occasions, and DCI sent on the repeated PDCCH monitoring occasions is for scheduling a same TB. Optionally, the first PDCCH monitoring occasion and the second PDCCH monitoring occasion correspond to different monitoring occasions of a search space set, and the monitoring occasion configuration information is configured in the search space set. For related descriptions of the transmission configuration information, refer to the foregoing embodiments.

In some embodiments, the network device may further determine the PUCCH resource in the following manner, to receive, on the PUCCH resource, the HARQ-ACK codebook sent by the terminal device:

The network device determines a group of DCI, where HARQ-ACK feedback information corresponding to the group of DCI is fed back on a same PUCCH resource, and the group of DCI includes first DCI and second DCI.

The network device sorts the group of DCI, where an order of the first DCI in the group of DCI is determined based on a first PDCCH monitoring occasion, and an order of the second DCI in the group of DCI is determined based on a second PDCCH monitoring occasion.

The network device determines target DCI from the group of DCI based on an order of each of the group of DCI, where the target DCI indicates the PUCCH resource. Optionally, the target DCI may be last sorted DCI after the group of DCI is sorted.

The foregoing manner of determining the PUCCH resource may be applied to a multiple chance (multiple chance) DCI transmission mechanism.

In some embodiments, the network device may further determine the PUCCH resource in the following manner, to receive, on the PUCCH resource, the HARQ-ACK codebook sent by the terminal device:

The network device determines a group of DCI, where HARQ-ACK feedback information corresponding to the group of DCI is fed back at a first moment, and the group of DCI includes second DCI.

The network device sorts the group of DCI, where an order of the second DCI in the group of DCI is determined based on a second PDCCH monitoring occasion.

The network device determines target DCI from the group of DCI based on an order of each of the group of DCI, where the target DCI indicates the PUCCH resource. Optionally, the target DCI may be last sorted DCI after the group of DCI is sorted.

The foregoing manner of determining the PUCCH resource may be applied to a multiple set (multiple chance) DCI transmission mechanism.

In some embodiments, the network device may further determine the PUCCH resource in the following manner, to receive, on the PUCCH resource, the HARQ-ACK codebook sent by the terminal:

The network device sends configuration information, where the configuration information indicates that a first PDCCH candidate and a second PDCCH candidate have an association relationship, first DCI corresponds to the first PDCCH candidate, and second DCI corresponds to the second PDCCH candidate.

The network device determines a group of DCI, where the group of DCI includes the first DCI and/or the second DCI, and HARQ-ACK feedback information corresponding to the group of DCI is fed back on a same PUCCH resource.

The network device sorts the group of DCI, where an order of the first DCI and/or the second DCI in the group of DCI is determined based on a first PDCCH monitoring occasion.

The network device determines target DCI from the group of DCI based on an order of each of the group of DCI, where the target DCI indicates the PUCCH resource.

The foregoing manner of determining the PUCCH resource may be applied to a repeated DCI transmission mechanism.

Based on a same inventive concept, an embodiment of this application further provides a communication apparatus. The communication apparatus may have a structure shown in FIG. 15. The communication apparatus may be the terminal device in the foregoing embodiments, or may be a chip or a chip system that can support the terminal device in implementing the foregoing method. When the communication apparatus is the terminal device in the foregoing embodiments, the communication apparatus performs a behavior function of the terminal device in the foregoing method embodiments.

As shown in FIG. 15, the communication apparatus 1500 may include a processing unit 1501 and a transceiver unit 1502. The communication apparatus 1500 may further include a storage unit 1503. The storage unit 1503 may be coupled to the processing unit 1501, and is configured to store a program and instructions that are required by the processing unit 1501 to perform a function.

Based on the communication apparatus shown in FIG. 15, the communication apparatus may implement the method shown in FIG. 7.

Specifically, in some embodiments, the transceiver unit 1502 may be configured to: detect first DCI on a first PDCCH monitoring occasion, and detect second DCI on a second PDCCH monitoring occasion, where the first DCI and the second DCI are for scheduling a same transport block TB, and the first DCI and the second DCI carry a same downlink assignment index DAI indication.

The processing unit 1501 may be configured to generate a HARQ-ACK codebook based on the first PDCCH monitoring occasion and the DAI indication carried in at least one of the first DCI and the second DCI.

The transceiver unit 1502 may be further configured to send the HARQ-ACK codebook.

In some embodiments, the processing unit 1501 may be configured to determine, based on the first PDCCH monitoring occasion and the DAI indication carried in at least one of the first DCI and the second DCI, a bit that is of a HARQ-ACK bit corresponding to the TB and that is in the HARQ-ACK codebook.

In some embodiments, the transceiver unit 1502 may be configured to receive monitoring occasion configuration information, where the monitoring occasion configuration information indicates that the first PDCCH monitoring occasion and the second PDCCH monitoring occasion are repeated PDCCH monitoring occasions, and DCI sent on the repeated PDCCH monitoring occasions is for scheduling a same TB.

In some embodiments, the first PDCCH monitoring occasion and the second PDCCH monitoring occasion correspond to different monitoring occasions of a search space set, and the monitoring occasion configuration information is configured in the search space set.

In some embodiments, the first DCI and the second DCI are located on a same component carrier or in a same BWP.

In some embodiments, the first DCI and the second DCI correspond to a same bit in the HARQ-ACK codebook.

In some embodiments, the DAI indication carried in the first DCI and the DAI indication carried the second DCI are determined based on an index value of the first PDCCH monitoring occasion.

In some embodiments, the index value of the first PDCCH monitoring occasion is less than an index value of the second PDCCH monitoring occasion.

In some embodiments, that the first DCI and the second DCI carry a same DAI indication includes: the first DCI and the second DCI carry a same counter DAI indication, and carry a same total DAI indication.

In some embodiments, the processing unit 1501 may be configured to: after receiving the first DCI and the second DCI, perform the following operations:

determining a group of DCI, where HARQ-ACK feedback information corresponding to the group of DCI is fed back on a same PUCCH resource, and the group of DCI includes the second DCI;

sorting the group of DCI, where an order of the second DCI in the group of DCI is determined based on the second PDCCH monitoring occasion; and determining target DCI from the group of DCI based on an order of each of the group of DCI, where the target DCI indicates the PUCCH resource.

In some embodiments, the processing unit 1501 may be configured to: after receiving the first DCI and the second DCI, perform the following operations:

determining a group of DCI, where HARQ-ACK feedback information corresponding to the group of DCI is fed back on a same PUCCH resource, and the group of DCI includes the first DCI and the second DCI;

sorting the group of DCI, where an order of the first DCI in the group of DCI is determined based on the first monitoring occasion, and an order of the second DCI in the group of DCI is determined based on the second PDCCH monitoring occasion; and determining target DCI from the group of DCI based on an order of each of the group of DCI, where the target DCI indicates the PUCCH resource.

In some embodiments, the processing unit 1501 may be configured to: before sending the HARQ-ACK codebook, perform the following operations:

receiving configuration information, where the configuration information indicates that a first PDCCH candidate and a second PDCCH candidate have an association relationship, the first DCI corresponds to the first PDCCH candidate, and the second DCI corresponds to the second PDCCH candidate;

determining a group of DCI, where the group of DCI includes the first DCI and/or the second DCI, and HARQ-ACK feedback information corresponding to the group of DCI is fed back on a same PUCCH resource;

sorting the group of DCI, where an order of the first DCI and/or the second DCI in the group of DCI is determined based on the first monitoring occasion; and determining target DCI from the group of DCI based on an order of each of the group of DCI, where the target DCI indicates the PUCCH resource.

In addition, an embodiment of this application further provides a communication apparatus. The communication apparatus may have a structure shown in FIG. 16. The communication apparatus may be a terminal device, or may be a chip or a chip system that can support the terminal device in implementing the foregoing method.

Figure 16:
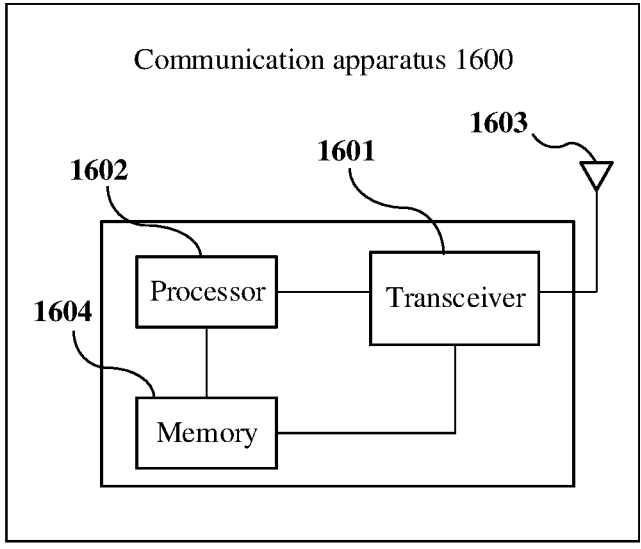
FIG. 16 is a schematic diagram of a structure of a communication apparatus according to an embodiment of this application.

The communication apparatus 1600 shown in FIG. 16 may include at least one processor 1602. The at least one processor 1602 is configured to be coupled to a memory, and read and execute instructions in the memory, to implement the steps related to the terminal device in the method provided in embodiments of this application. Optionally, the communication apparatus 1600 may further include a transceiver 1601 configured to support the communication apparatus 1600 in receiving or sending signaling or data. The transceiver 1601 in the communication apparatus 1600 may be configured to implement functions of the transceiver unit 1502. For example, the transceiver 1601 may be configured to cause the communication apparatus 1600 to perform the step of receiving DCI in the method shown in FIG. 7. The processor 1602 may be configured to implement functions of the processing unit 1501. For example, the processor 1602 may be configured to cause the communication apparatus 1600 to perform the step of generating a HARQ-ACK codebook in the method shown in FIG. 7. In addition, the transceiver 1601 may be coupled to an antenna 1603, and is configured to support the communication apparatus 1600 in performing communication. Optionally, the communication apparatus 1600 may further include a memory 1604, where the memory stores a computer program and instructions. The memory 1604 may be coupled to the processor 1602 and/or the transceiver 1601, and is configured to support the processor 1602 in invoking the computer program and the instructions in the memory 1604, to implement the steps related to the terminal device in the method provided in embodiments of this application. In addition, the memory 1604 may be further configured to store data in the method embodiments of this application. For example, the memory is configured to store data and instructions that are required for supporting the transceiver 1601 in implementing interaction, and/or is configured to store configuration information required for the communication apparatus 1600 to perform the method in embodiments of this application.

Based on a same inventive concept, an embodiment of this application further provides a communication apparatus. The communication apparatus may have a structure shown in FIG. 17. The communication apparatus may be the network device in the foregoing embodiments, or may be a chip or a chip system that can support the network device in implementing the foregoing method. When the communication apparatus is the network device in the foregoing embodiments, the communication apparatus performs a behavior function of the network device in the foregoing method embodiments.

Figure 17:
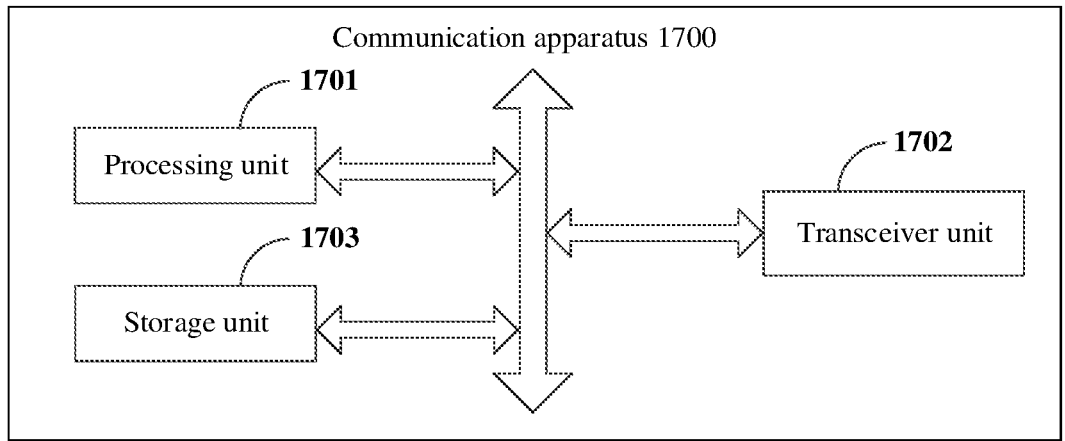
FIG. 17 is a schematic diagram of a structure of a communication apparatus according to another embodiment of this application.

As shown in FIG. 17, the communication apparatus 1700 may include a processing unit 1701 and a transceiver unit 1702. The communication apparatus 1700 may further include a storage unit 1703. The storage unit 1703 may be coupled to the processing unit 1701, and is configured to store a program and instructions that are required by the processing unit 1701 to perform a function.

Based on the communication apparatus shown in FIG. 17, the communication apparatus may implement the method shown in FIG. 14.

Specifically, in some embodiments, the transceiver unit 1702 may be configured to: send first DCI on a first PDCCH monitoring occasion, and send second DCI on a second PDCCH monitoring occasion, where the first DCI and the second DCI are for scheduling a same transport block TB, and the first DCI and the second DCI carry a same downlink assignment index DAI indication.

The transceiver unit 1702 may be further configured to receive a HARQ-ACK codebook sent by a terminal device.

The processing unit 1701 may be configured to determine, based on the first PDCCH monitoring occasion and the DAI indication carried in at least one of the first DCI and the second DCI, HARQ-ACK feedback information corresponding to the TB in the HARQ-ACK codebook.

In some embodiments, the processing unit 1701 may be configured to determine, based on the first PDCCH monitoring occasion and the DAI indication carried in at least one of the first DCI and the second DCI, a bit that is of a HARQ-ACK bit corresponding to the TB and that is in the HARQ-ACK codebook.

In some embodiments, the transceiver unit 1702 may be further configured to send monitoring occasion configuration information, where the monitoring occasion configuration information indicates that the first PDCCH monitoring occasion and the second PDCCH monitoring occasion are repeated PDCCH monitoring occasions, and DCI sent on the repeated PDCCH monitoring occasions is for scheduling a same TB.

In some embodiments, the first PDCCH monitoring occasion and the second PDCCH monitoring occasion correspond to different monitoring occasions of a search space set, and the monitoring occasion configuration information is configured in the search space set.

In some embodiments, the first DCI and the second DCI are located on a same component carrier or in a same BWP.

In some embodiments, the first DCI and the second DCI correspond to a same bit in the HARQ-ACK codebook.

In some embodiments, the DAI indication carried in the first DCI and the DAI indication carried the second DCI are determined based on an index value of the first PDCCH monitoring occasion.

In some embodiments, the index value of the first PDCCH monitoring occasion is less than an index value of the second PDCCH monitoring occasion.

In some embodiments, that the first DCI and the second DCI carry a same DAI indication includes: the first DCI and the second DCI carry a same counter DAI indication, and carry a same total DAI indication.

In some embodiments, the processing unit 1701 may be configured to perform the following operations:

determining a group of DCI, where HARQ-ACK feedback information corresponding to the group of DCI is fed back on a same PUCCH resource, and the group of DCI includes the second DCI;

sorting the group of DCI, where an order of the second DCI in the group of DCI is determined based on the second PDCCH monitoring occasion; and determining target DCI from the group of DCI based on an order of each of the group of DCI, where the target DCI indicates the PUCCH resource.

In some embodiments, the processing unit 1701 may be configured to perform the following operations:

In some embodiments, the processing unit 1701 may be configured to perform the following operations:

sending configuration information, where the configuration information indicates that a first PDCCH candidate and a second PDCCH candidate have an association relationship, the first DCI corresponds to the first PDCCH candidate, and the second DCI corresponds to the second PDCCH candidate;

determining a group of DCI, where HARQ-ACK feedback information corresponding to the group of DCI is fed back on a same PUCCH resource, and the group of DCI includes the first DCI and the second DCI;

sorting the group of DCI, where an order of the first DCI in the group of DCI is determined based on the first monitoring occasion, and an order of the second DCI in the group of DCI is determined based on the second PDCCH monitoring occasion; and determining target DCI from the group of DCI based on an order of each of the group of DCI, where the target DCI indicates the PUCCH resource.

In addition, an embodiment of this application further provides a communication apparatus. The communication apparatus may have a structure shown in FIG. 18. The communication apparatus may be a network device, or may be a chip or a chip system that can support the network device in implementing the foregoing method.

Figure 18:
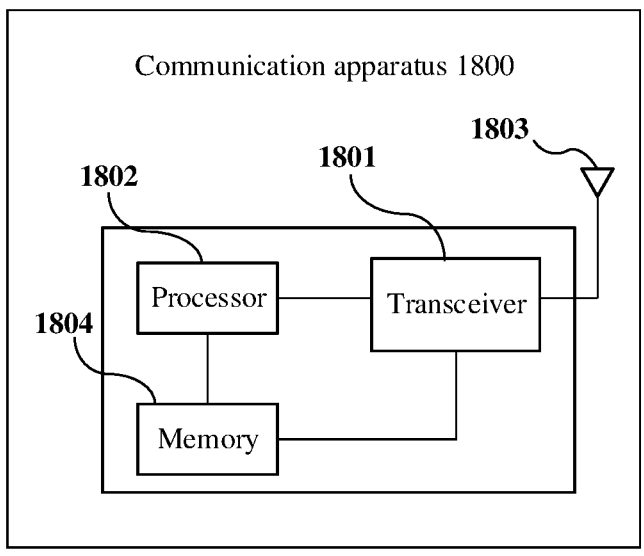
FIG. 18 is a schematic diagram of a structure of a communication apparatus according to another embodiment of this application.

The communication apparatus 1800 shown in FIG. 18 may include at least one processor 1802. The at least one processor 1802 is configured to be coupled to a memory, and read and execute instructions in the memory, to implement the steps related to the terminal device in the method provided in embodiments of this application. Optionally, the communication apparatus 1800 may further include a transceiver 1801 configured to support the communication apparatus 1800 in receiving or sending signaling or data. The transceiver 1801 in the communication apparatus 1800 may be configured to implement functions of the transceiver unit 1702. For example, the transceiver 1801 may be configured to cause the communication apparatus 1800 to perform the step of sending DCI in the method shown in FIG. 14. The processor 1802 may be configured to implement functions of the processing unit 1701. For example, the processor 1802 may be configured to cause the communication apparatus 1800 to perform the step of determining HARQ-ACK feedback information in the method shown in FIG. 14. In addition, the transceiver 1801 may be coupled to an antenna 1803, and is configured to support the communication apparatus 1800 in performing communication. Optionally, the communication apparatus 1800 may further include a memory 1804, where the memory stores a computer program and instructions. The memory 1804 may be coupled to the processor 1802 and/or the transceiver 1801, and is configured to support the processor 1802 in invoking the computer program and the instructions in the memory 1804, to implement the steps related to the network device in the method provided in embodiments of this application. In addition, the memory 1804 may be further configured to store data in the method embodiments of this application. For example, the memory is configured to store data and instructions that are required for supporting the transceiver 1801 in implementing interaction, and/or is configured to store configuration information required for the communication apparatus 1800 to perform the method in embodiments of this application.

Based on the same concept as the foregoing method embodiments, an embodiment of this application further provides a computer-readable storage medium. The computer-readable storage medium stores some instructions. When the instructions are invoked and executed by a computer, the computer is caused to perform the method in the foregoing method embodiments and any possible design of the foregoing method embodiments. In this embodiment of this application, the computer-readable storage medium is not limited. For example, the computer-readable storage medium may be a RAM (random access memory, random access memory) or a ROM (read-only memory, read-only memory).

Based on the same concept as the foregoing method embodiments, this application further provides a computer program product. When being invoked and executed by a computer, the computer program product can perform the method in the foregoing method embodiments and any possible design of the foregoing method embodiments.

Based on the same concept as the foregoing method embodiments, this application further provides a chip. The chip may include a processor and an interface circuit, to complete the method in the foregoing method embodiments and any possible implementation of the foregoing method embodiments. "Coupling" means that two components are directly or indirectly combined with each other. The combination may be fixed or movable, and the combination may allow communication of fluid, electricity, an electrical signal, or another type of signal between two components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium in any other form in the art. For example, the storage medium may be connected to a processor, so that the processor may read information from the storage medium and write information to the storage medium. Alternatively, the storage medium may be integrated into a processor. The processor and the storage medium may be disposed in an ASIC, and the ASIC may be disposed in a terminal device. Optionally, the processor and the storage medium may alternatively be disposed in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, it is clear that various modifications and combinations may be made to the present invention without departing from the scope of the present invention. Correspondingly, the specification and accompanying drawings are merely example descriptions of the present invention defined by the appended claims, and is considered as any of or all modifications, variations, combinations or equivalents that cover the scope of the present invention. It is clear that, a person skilled in the art can make various modifications and variations to the present invention without departing from the spirit and scope of the present invention. In this way, the present invention is intended to cover these modifications and variations provided that the modifications and variations fall within the scope of the claims and equivalent technologies of the present invention.

What is claimed is:

1. A method, comprising:
  receiving, by a communication apparatus, configuration information, wherein the configuration information indicates that a first physical downlink control channel (PDCCH) candidate and a second PDCCH candidate have an association relationship;
  detecting, by the communication apparatus, first downlink control information (DCI) on a first PDCCH monitoring occasion, and detecting second DCI on a second PDCCH monitoring occasion, wherein the first DCI and the second DCI schedule a same transport block (TB), the first DCI and the second DCI carry a same downlink assignment index (DAI) indication, the first DCI corresponds to the first PDCCH candidate, and the second DCI corresponds to the second PDCCH candidate;
  determining a group of DCI, wherein the group of DCI comprises the first DCI or the second DCI, and HARQ-ACK feedback information corresponding to the group of DCI is fed back on a same physical uplink control channel (PUCCH) resource;
  sorting the group of DCI, wherein an order of the first DCI or the second DCI in the group of DCI is determined based on the first PDCCH monitoring occasion;
  determining target DCI from the group of DCI based on an order of each DCI of the group of DCI, wherein the target DCI indicates the same PUCCH resource;
  generating, by the communication apparatus, a hybrid automatic repeat request acknowledgement (HARQ-ACK) codebook based on the first PDCCH monitoring occasion and the DAI indication carried in at least one DCI of the first DCI and the second DCI; and
  sending, by the communication apparatus, the HARQ-ACK codebook.

2. The method according to claim 1, wherein generating, by the communication apparatus, the HARQ-ACK codebook based on the first PDCCH monitoring occasion and the DAI indication carried in at least one DCI of the first DCI and the second DCI comprises:
  determining, by the communication apparatus based on the first PDCCH monitoring occasion and the DAI indication carried in the at least one DCI of the first DCI and the second DCI, a HARQ-ACK bit corresponding to the TB that is in the HARQ-ACK codebook.

3. The method according to claim 1, wherein the first DCI and the second DCI correspond to a same bit in the HARQ-ACK codebook.

4. The method according to claim 1, wherein the DAI indication carried in the first DCI and the DAI indication carried in the second DCI are determined based on an index value of the first PDCCH monitoring occasion.

5. The method according to claim 1, wherein an index value of the first PDCCH monitoring occasion is less than an index value of the second PDCCH monitoring occasion.

6. A method, comprising:
  sending, by a communication apparatus, configuration information, wherein the configuration information indicates that a first physical downlink control channel (PDCCH) candidate and a second PDCCH candidate have an association relationship;
  sending, by the communication apparatus, first downlink control information (DCI) on a first PDCCH monitoring occasion, and sending second DCI on a second PDCCH monitoring occasion, wherein the first DCI and the second DCI schedule a same transport block (TB), the first DCI and the second DCI carry a same downlink assignment index (DAI) indication, the first DCI corresponds to the first PDCCH candidate, and the second DCI corresponds to the second PDCCH candidate;
  determining, by the communication apparatus, a group of DCI, wherein the group of DCI comprises the first DCI or the second DCI, and HARQ-ACK feedback information corresponding to the group of DCI is fed back on a same physical uplink control channel (PUCCH) resource;
  sorting, by the communication apparatus, the group of DCI, wherein an order of the first DCI or the second DCI in the group of DCI is determined based on the first PDCCH monitoring occasion;
  determining, by communication apparatus, target DCI from the group of DCI based on an order of each DCI of the group of DCI, wherein the target DCI indicates the same PUCCH resource;
  receiving, by the communication apparatus, a hybrid automatic repeat request acknowledgement (HARQ-ACK) codebook sent by a terminal device; and
  determining, by the communication apparatus based on the first PDCCH monitoring occasion and the DAI indication carried in at least one DCI of the first DCI and the second DCI, HARQ-ACK feedback information corresponding to the TB that is in the HARQ-ACK codebook.

7. The method according to claim 6, wherein determining, by the communication apparatus based on the first PDCCH monitoring occasion and the DAI indication carried in the at least one DCI of the first DCI and the second DCI, the HARQ-ACK feedback information corresponding to the TB in the HARQ-ACK codebook comprises:

determining, by the communication apparatus based on the first PDCCH monitoring occasion and the DAI indication carried in the at least one DCI of the first DCI and the second DCI, a HARQ-ACK bit corresponding to the TB in the HARQ-ACK codebook.

8. The method according to claim 6, wherein the first DCI and the second DCI correspond to a same bit in the HARQ-ACK codebook.

9. The method according to claim 6, wherein the DAI indication carried in the first DCI and the DAI indication carried in the second DCI are determined based on an index value of the first PDCCH monitoring occasion.

10. The method according to claim 6, wherein an index value of the first PDCCH monitoring occasion is less than an index value of the second PDCCH monitoring occasion.

11. An apparatus, comprising:

at least one processor, wherein the at least one processor is connected to a memory storing a program, the at least one processor is configured to read and execute the program stored in the memory, wherein executing the program causes the apparatus to perform the following operations:

receiving configuration information, wherein the configuration information indicates that a first physical downlink control channel (PDCCH) candidate and a second PDCCH candidate have an association relationship;

detecting first downlink control information (DCI) on a first PDCCH monitoring occasion, and detecting second DCI on a second PDCCH monitoring occasion, wherein the first DCI and the second DCI schedule a same transport block (TB), the first DCI and the second DCI carry a same downlink assignment index (DAI) indication, the first DCI corresponds to the first PDCCH candidate, and the second DCI corresponds to the second PDCCH candidate;

determining a group of DCI, wherein the group of DCI comprises the first DCI or the second DCI, and HARQ-ACK feedback information corresponding to the group of DCI is fed back on a same physical uplink control channel (PUCCH) resource;

sorting the group of DCI, wherein an order of the first DCI or the second DCI in the group of DCI is determined based on the first PDCCH monitoring occasion;

determining target DCI from the group of DCI based on an order of each DCI of the group of DCI, wherein the target DCI indicates the same PUCCH resource;

generating a hybrid automatic repeat request acknowledgement (HARQ-ACK) codebook based on the first PDCCH monitoring occasion and the DAI indication carried in at least one DCI of the first DCI and the second DCI; and sending the HARQ-ACK codebook.

12. The apparatus according to claim 11, wherein generating the HARQ-ACK codebook based on the first PDCCH monitoring occasion and the DAI indication carried in the at least one DCI of the first DCI and the second DCI comprises:

determining, based on the first PDCCH monitoring occasion and the DAI indication carried in the at least one DCI of the first DCI and the second DCI, a HARQ-ACK bit corresponding to the TB in the HARQ-ACK codebook.

13. The apparatus according to claim 11, wherein the first DCI and the second DCI correspond to a same bit in the HARQ-ACK codebook.

14. The apparatus according to claim 11, wherein the DAI indication carried in the first DCI and the DAI indication carried in the second DCI are determined based on an index value of the first PDCCH monitoring occasion.

15. The apparatus according to claim 11, wherein an index value of the first PDCCH monitoring occasion is less than an index value of the second PDCCH monitoring occasion.

16. An apparatus, comprising:

at least one processor, wherein the at least one processor is connected to a memory storing a program, the at least one processor is configured to read and execute the program stored in the memory, wherein executing the program causes the apparatus to perform the following operations:

sending configuration information, wherein the configuration information indicates that a first physical downlink control channel (PDCCH) candidate and a second PDCCH candidate have an association relationship;

sending first downlink control information (DCI) on a first PDCCH monitoring occasion, and sending second DCI on a second PDCCH monitoring occasion, wherein the first DCI and the second DCI schedule a same transport block (TB), the first DCI and the second DCI carry a same downlink assignment index (DAI) indication, and the first DCI corresponds to the first PDCCH candidate, and the second DCI corresponds to the second PDCCH candidate;

determining a group of DCI, wherein the group of DCI comprises the first DCI or the second DCI, and HARQ-ACK feedback information corresponding to the group of DCI is fed back on a same physical uplink control channel (PUCCH) resource;

sorting the group of DCI, wherein an order of the first DCI or the second DCI in the group of DCI is determined based on the first PDCCH monitoring occasion;

determining target DCI from the group of DCI based on an order of each DCI of the group of DCI, wherein the target DCI indicates the same PUCCH resource;

receiving a hybrid automatic repeat request acknowledgement (HARQ-ACK) codebook sent by a terminal device; and determining, based on the first PDCCH monitoring occasion and the DAI indication carried in at least one DCI of the first DCI and the second DCI, HARQ-ACK feedback information corresponding to the TB in the HARQ-ACK codebook.

17. The apparatus according to claim 16, wherein executing the program causes the apparatus to perform the following further operations:

determine, based on the first PDCCH monitoring occasion and the DAI indication carried in at least one DCI of the first DCI and the second DCI, a HARQ-ACK bit corresponding to the TB in the HARQ-ACK codebook.

18. The apparatus according to claim 16, wherein the first DCI and the second DCI correspond to a same bit in the HARQ-ACK codebook.

19. The apparatus according to claim 16, wherein the DAI indication carried in the first DCI and the DAI indication carried in the second DCI are determined based on an index value of the first PDCCH monitoring occasion.

20. The apparatus according to claim 16, wherein an index value of the first PDCCH monitoring occasion is less than an index value of the second PDCCH monitoring occasion.

* * * * *